United States Patent
Qiu

(10) Patent No.: US 12,141,593 B2
(45) Date of Patent: Nov. 12, 2024

(54) METHOD FOR DISPLAYING PLAY SCREEN AND ELECTRONIC DEVICE

(71) Applicant: HONOR DEVICE CO., LTD., Shenzhen (CN)

(72) Inventor: Jianbin Qiu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/799,666

(22) PCT Filed: Apr. 27, 2022

(86) PCT No.: PCT/CN2022/089659
§ 371 (c)(1),
(2) Date: Aug. 13, 2022

(87) PCT Pub. No.: WO2023/015961
PCT Pub. Date: Feb. 16, 2023

(65) Prior Publication Data
US 2024/0192968 A1 Jun. 13, 2024

(30) Foreign Application Priority Data
Aug. 12, 2021 (CN) .......................... 202110926372.7

(51) Int. Cl.
*G06F 9/451* (2018.01)
*G06F 1/3234* (2019.01)

(52) U.S. Cl.
CPC .......... *G06F 9/451* (2018.02); *G06F 1/3265* (2013.01)

(58) Field of Classification Search
None
See application file for complete search history.

(56) References Cited

U.S. PATENT DOCUMENTS

| 10,970,298 B1 * | 4/2021 | Madheswaran ......... H04L 41/22 |
| 2006/0066645 A1 * | 3/2006 | Ng ....................... G09G 3/2033 345/691 |
| 2022/0236863 A1 * | 7/2022 | Wilensky ................. G06T 5/50 |

FOREIGN PATENT DOCUMENTS

| CN | 103188548 A | 7/2013 |
| CN | 106534875 A | 3/2017 |
| CN | 106919402 A | 7/2017 |
| CN | 107203646 A | 9/2017 |
| CN | 107957831 A | 4/2018 |
| CN | 110928397 A | 3/2020 |

(Continued)

*Primary Examiner* — Toan H Vu
(74) *Attorney, Agent, or Firm* — WOMBLE BOND DICKINSON (US) LLP

(57) ABSTRACT

A method for displaying a play screen and an electronic device relate to the field of terminal technologies to reduce power consumption of an electronic device. The method includes: determining, by the electronic device based on a preset condition, whether the screen element in the play screen includes a second dynamic element, where the second dynamic element has a second frame rate, and the preset condition includes that: an area proportion of the second dynamic element in the play screen is less than a preset threshold, and the second frame rate is greater than the first frame rate; and when the screen element in the play screen includes the second dynamic element, displaying, by the electronic device, the play screen of the foreground application at the first frame rate.

20 Claims, 17 Drawing Sheets

(56) References Cited

FOREIGN PATENT DOCUMENTS

| | | |
|---|---|---|
| CN | 111163345 A | 5/2020 |
| CN | 111643901 A | 9/2020 |
| CN | 111813467 A | 10/2020 |
| CN | 111988659 A | 11/2020 |
| JP | 2005341398 A | 12/2005 |

\* cited by examiner

An electronic device determines whether a screen element in a play screen includes a second dynamic element, where the second dynamic element has a second frame rate, and a preset condition includes that: an area proportion of the second dynamic element in the play screen is less than a preset threshold, and the second frame rate is greater than a first frame rate ⸺ S901

When the screen element in the play screen includes the second dynamic element, the electronic device displays a play screen of a foreground application at the first frame rate ⸺ S902

FIG. 9A

METHOD FOR DISPLAYING PLAY SCREEN AND ELECTRONIC DEVICE

This application is a National Stage of International Application No. PCT/CN2022/089659, filed on Apr. 27, 2022, which claims priority to Chinese Patent Application No. 202110926372.7, filed on Aug. 12, 2021. Both of the aforementioned applications are hereby incorporated by reference in their entireties.

TECHNICAL FIELD

Embodiments of this application relate to the field of terminal technologies, and in particular, to a method for displaying a play screen and an electronic device.

BACKGROUND

At present, play screens for some applications (Application, APP) (such as short video APPs or video play APPs) may include some dynamic elements (for example, a dynamic music play element and a dynamic like element) in addition to a video to improve a play effect of the video. For example, a video play screen displays a dynamic music play element in addition to a video; and a live streaming screen displays a dynamic comment element, a dynamic like element, and the like in addition to a live streaming video.

The video is also a dynamic element. Because a play screen includes multiple dynamic elements, an electronic device updates the play screen in real time. In addition, the electronic device may update different dynamic elements in the play screen at different frame rates. In this way, each updated frame of play screen shows different updated dynamic elements.

To reduce power consumption, the electronic device typically discards any updated frame of play screen at regular intervals (that is, to reduce a screen refresh rate). In this way, although the power consumption of the electronic device in displaying the play screen can be reduced by reducing the refresh rate of the play screen, discarding of any updated frame of play screen causes an updated picture of a dynamic element not to be displayed because the discarded any updated frame of play screen may include the updated picture of the dynamic element. As a result, play of the dynamic element may freeze.

SUMMARY

Embodiments of this application provide a method for displaying a play screen and an electronic device to reduce power consumption of an electronic device in displaying a play screen and reduce a probability of freezing in display of the play screen.

To achieve the foregoing objectives, the following technical solutions are used in this application.

According to a first aspect, this application provides a method for displaying a play screen. The method is used by an electronic device for displaying a play screen of a foreground application, a screen element in the play screen of the foreground application includes a first dynamic element, and the first dynamic element has a first frame rate. The method includes: determining, by the electronic device based on a preset condition, whether the screen element in the play screen includes a second dynamic element, where the second dynamic element has a second frame rate, and the preset condition includes that: an area proportion of the second dynamic element in the play screen is less than a preset threshold, and the second frame rate is greater than the first frame rate; and when the screen element in the play screen includes the second dynamic element, displaying, by the electronic device, the play screen of the foreground application at the first frame rate.

It can be understood that the area proportion of each second dynamic element in the play screen is less than the preset threshold, meaning that the second dynamic element occupies a relatively small area in the play screen, and therefore the second dynamic element is less attractive to a user. It can be learned from this that the user usually does not focus on the second dynamic element when watching the play screen. If the screen element in the play screen includes the second dynamic element, the electronic device displays the play screen of the foreground application at the first frame rate. Displaying the play screen of the foreground application at the first frame rate means that the electronic device updates the play screen of the foreground application at the first frame rate. In this case, a frame rate at which the electronic device updates the second dynamic element in the play screen does not exceed the first frame rate. Since the second frame rate of the second dynamic element is greater than the first frame rate, it can be learned that the frame rate of updating the second dynamic element is reduced, so that power consumption of the electronic device in displaying the play screen can be reduced.

Further, it can be learned from the foregoing analysis of "the user usually does not focus on the second dynamic element when watching the play screen" that when the electronic device adopts the solution of this application to reduce a second frame rate of at least one second dynamic element, the user finds that a probability of freezing in play of the second dynamic element is also low. In this way, the probability of freezing in display of the play screen is reduced.

In a possible design, the preset condition further includes that a background color of an area in which the second dynamic element is located is transparent.

In another possible design, the preset condition further includes that the second dynamic element is located at an edge of the play screen.

It can be understood that a background color of an area in which each second dynamic element is located is transparent and the second dynamic element is located at an edge of the play screen, each meaning that the second dynamic element is less attractive to a user and that the user is more likely not to focus on the second dynamic element when watching the play screen. Therefore, if the electronic device reduces a frame rate of a second dynamic element that satisfies at least one of the following: an area proportion of the second dynamic element in the play screen is less than a preset threshold, a background color of an area in which the second dynamic element is located is transparent, and the second dynamic element is located at an edge of the play screen, the user finds that the probability of freezing in play of the second dynamic element is low. In this way, the probability of freezing in display of the play screen is reduced.

In another possible design, the displaying, by the electronic device, the play screen of the foreground application at the first frame rate includes: drawing, by the electronic device, a first picture in response to the i-th periodic signal; determining, by the electronic device, whether the first picture includes a picture of the first dynamic element; and if the first picture does not include the picture of the first dynamic element, displaying a play screen displayed corresponding to the (i−1)-th periodic signal; where i is an integer, and i takes a value in {2, 3, 4 . . . } in sequence.

In another possible design, the drawing, by the electronic device, a first picture in response to the i-th periodic signal further includes: replicating a second picture, where the second picture includes a picture of a static element; and the method further includes: if the first picture includes the picture of the first dynamic element, displaying a play screen including the first picture and the second picture.

It can be understood that the first picture drawn by the electronic device in response to the i-th periodic signal does not include the picture of the first dynamic element, meaning that the electronic device does not draw the picture of the first dynamic element in response to the i-th periodic signal. After the electronic device executes the i-th drawing procedure, the electronic device displays a play screen displayed corresponding to the (i−1)-th periodic signal.

In addition, because the second frame rate of the second dynamic element is greater than the first frame rate of the first dynamic element, when i takes a value, the electronic device does not draw the picture of the first dynamic element but draws a picture of the second dynamic element in response to the i-th periodic signal. However, when the electronic device does not draw the picture of the first dynamic element but displays the play screen displayed corresponding to the (i−1)-th periodic signal, and the play screen displayed corresponding to the (i−1)-th periodic signal does not include a picture (including the drawn picture of the second dynamic element) drawn in response to the i-th periodic signal, the electronic device does not display the picture of the second dynamic element updated in the i-th drawing procedure. In this way, the frame rate of updating the second dynamic element can be reduced.

Moreover, after the first picture drawn by the electronic device in response to the i-th periodic signal includes the picture of the first dynamic element, the play screen including the first picture and the second picture is displayed. Since the first picture also includes the drawn picture of the first dynamic element, it can be determined that the play screen including the first picture and the second picture includes an updated picture of the first dynamic element. To sum up, it can be learned that only when the electronic device draws a picture of the second dynamic element and a picture of a first dynamic element in response to a periodic signal, the electronic device generates and displays a new play screen based on layers of all screen elements obtained in response to the periodic signal. In other words, the second dynamic element is updated at the same time as the first dynamic element is updated. In this case, a reduced frame rate of the second dynamic element is equal to the first frame rate of the first dynamic element.

Further, it can be learned from the foregoing analysis of "the user usually does not focus on the second dynamic element when watching the play screen" that when the electronic device adopts the solution of this application to reduce the frame rate of updating the second dynamic element, the user finds that a probability of freezing in play of the second dynamic element is also low. In this way, the probability of freezing in display of the play screen is reduced.

In addition, the electronic device displays the play screen displayed corresponding to the (i−1)-th periodic signal, which is an already obtained play screen, no longer generates a new play screen within a signal period of the i-th periodic signal, but continues to display this first play screen. This can also reduce power consumption of the electronic device.

Moreover, that an area proportion of the first dynamic element in the play screen is greater than a preset threshold means that the first dynamic element occupies a larger area in the play screen, and therefore the first dynamic element is more attractive to a user. It can be learned from this that the user usually focuses on the first dynamic element when watching the play screen. Furthermore, it can be learned from the foregoing analysis of "the play screen including the first picture and the second picture includes an updated picture of the first dynamic element" that after drawing the picture of the first dynamic element, the electronic device displays the play screen including the first picture, the second picture, and the updated picture of the first dynamic element. It can further be learned from the foregoing analysis of "the user usually focuses on the first dynamic element when watching the play screen" that after drawing the picture of the first dynamic element in response to the i-th periodic signal, the electronic device displays the play screen including the first picture and the second picture, which can ensure that the user can watch smooth play of the first dynamic element.

In another possible design, the second frame rate is twice the first frame rate; a reciprocal of the signal period of the i-th periodic signal is equal to the second frame rate; the first picture includes a picture of the second dynamic element; and the replicating a second picture includes: if a picture of the first dynamic element is drawn in response to the (i−1)-th periodic signal, replicating the picture of the first dynamic element drawn in response to the (i−1)-th periodic signal.

It can be understood that when the reciprocal of the signal period of the i-th periodic signal is equal to the second frame rate of the second dynamic element, the electronic device updates the picture of the second dynamic element in response to each periodic signal. When the second frame rate of the second dynamic element is twice the first frame rate of the first dynamic element, the electronic device updates the picture of the first dynamic element every two periodic signals. In this case, i is equal to 1.

Further, if both the picture of the first dynamic element and the picture of the second dynamic element are drawn in response to the i-th periodic signal, the electronic device displays the play screen including the first picture and the second picture. The play screen including the first picture and the second picture includes an updated picture of the first dynamic element and an updated picture of the second dynamic element, meaning that the updated picture of the first dynamic element and the updated picture of the second dynamic element are displayed. When only the picture of the second dynamic element is updated in response to the i-th periodic signal, the play screen displayed corresponding to the (i−1)-th periodic signal is displayed, meaning that the updated picture of the second dynamic element is not displayed. In this way, the electronic device displays only the picture of the first dynamic element and the picture of the second dynamic element that are updated at the same time, so that the second frame rate of the second dynamic element is reduced, and the reduced second frame rate of the second dynamic element is equal to the first frame rate of the first dynamic element.

In another possible design, the displaying a play screen displayed corresponding to the (i−1)-th periodic signal further includes: skipping rendering the first picture.

It can be understood that the first picture drawn in response to the i-th periodic signal does not include the drawn picture of the first dynamic element, meaning that the electronic device does not update the picture of the first dynamic element in response to the i-th periodic signal. Based on the foregoing analysis of "the focus is usually on the first dynamic element", after displaying first picture drawn in responding to the i-th periodic signal, the electronic device may not continue to render the first picture, that is, skip rendering the picture. In this way, power consumption generated in multiple procedures such as rendering, composition, and displaying can be avoided, thereby reducing the power consumption of the electronic device.

In another possible design, a reciprocal of the signal period of the i-th periodic signal is equal to m times the first frame rate of the first dynamic element, and m is a positive integer greater than 1. The replicating a second picture includes: if the picture of the first dynamic element is drawn in the first period corresponding to the i-th periodic signal, replicating the picture of the first dynamic element drawn in the first period, where the first period is a reciprocal of the first frame rate.

In another possible design, before the determining, by the electronic device based on a preset condition, whether the screen element in the play screen includes a second dynamic element, the method further includes: obtaining, by the electronic device, a visual attribute of each screen element in the play screen, where the visual attribute includes a dimension of the screen element; and calculating an area proportion based on the dimension of the screen element.

In another possible design, the preset condition further includes that: the second dynamic element is located at an edge of the play screen, and the visual attribute further includes coordinates of a start point of the screen element in the play screen. After the obtaining a visual attribute of each screen element in the play screen, the method further includes: determining, based on the dimension of the screen element and the coordinates of the start point of the screen element in the play screen, whether the second dynamic element is located at the edge of the play screen.

In another possible design, the method further includes: if a first picture drawn by the electronic device in response to the j-th periodic signal includes the picture of the first dynamic element, adding a first icon, where the first icon is used to indicate that the picture of the first dynamic element is drawn in response to the j-th periodic signal; and if the first picture drawn by the electronic device in response to the j-th periodic signal does not include the picture of the first dynamic element, adding a second icon, where the second icon is used to indicate that the picture of the first dynamic element is not drawn in response to the j-th periodic signal; where j is an integer, and j takes a value in {1, 2, 3, 4 . . . } in sequence.

It can be understood that, after responding to any periodic signal (for example, the first periodic signal or the second periodic signal), the electronic device adds an icon (for example, a first icon or a second icon) for indicating to draw a picture of a screen element in response to any periodic signal. The electronic device can determine, based on the screen element indicated by the icon, whether to display a first screen element or a second screen element.

According to a second aspect, this application provides an electronic device. The electronic device includes a memory and one or more processors. The memory is coupled to the processor. The memory stores computer program code, and the computer program code includes computer instructions. When the computer instructions are executed by the processor, the electronic device is enabled to perform the method according to any one of the first aspect and the possible designs thereof.

According to a third aspect, this application provides an electronic device. The electronic device includes a memory, a display, and one or more processors. The memory and the display are coupled to the processor. The display is configured to display a play screen of a foreground application, a screen element in the play screen of the foreground application includes a first dynamic element, and the first dynamic element has a first frame rate. The memory stores computer program code, and the computer program code includes computer instructions. When the computer instructions are executed by the processor, the electronic device is enabled to perform the following steps: determining, based on a preset condition, whether the screen element in the play screen includes a second dynamic element, where the second dynamic element has a second frame rate, and the preset condition includes that: an area proportion of the second dynamic element in the play screen is less than a preset threshold, and the second frame rate is greater than the first frame rate; and when the screen element in the play screen includes the second dynamic element, displaying the play screen of the foreground application at the first frame rate.

In a possible design of the third aspect, the preset condition further includes that: a background color of an area in which the second dynamic element is located is transparent.

In another possible design of the third aspect, the preset condition further includes that: the second dynamic element is located at an edge of the play screen.

In another possible design of the third aspect, when the computer instructions are executed by the processor, the electronic device is enabled to further perform the following steps: drawing, by the electronic device, a first picture in response to the i-th periodic signal; determining whether the first picture includes a picture of the first dynamic element; and if the first picture does not include the picture of the first dynamic element, displaying a play screen displayed corresponding to the (i−1)-th periodic signal; where i is an integer, and i takes a value in {2, 3, 4 . . . } in sequence.

In another possible design of the third aspect, when the computer instructions are executed by the processor, the electronic device is enabled to further perform the following steps: replicating a second picture, where the second picture includes a picture of a static element; and if the first picture includes the picture of the first dynamic element, displaying a play screen including the first picture and the second picture.

In another possible design of the third aspect, the second frame rate of the second dynamic element is twice the first frame rate of the first dynamic element; a reciprocal of a signal period of the i-th periodic signal is equal to the second frame rate of the second dynamic element; and the first picture includes a picture of the second dynamic element.

In a possible design of the third aspect, when the computer instructions are executed by the processor, the electronic device is enabled to further perform the following step: if a picture of the first dynamic element is drawn in response to the (i−1)-th periodic signal, replicating the picture of the first dynamic element drawn in response to the (i−1)-th periodic signal.

In a possible design of the third aspect, when the computer instructions are executed by the processor, the electronic device is enabled to further perform the following step: skipping rendering the first picture.

In a possible design of the third aspect, a reciprocal of the signal period of the i-th periodic signal is equal to m times the first frame rate of the first dynamic element, and m is a positive integer greater than 1, and if the picture of the first dynamic element is drawn in the first period corresponding to the i-th periodic signal, replicating the picture of the first dynamic element drawn in the first period, where the first period is a reciprocal of the first frame rate.

In a possible design of the third aspect, when the computer instructions are executed by the processor, the electronic device is enabled to further perform the following steps: before the determining, by the electronic device based on a preset condition, whether the screen element in the play screen includes a second dynamic element, obtaining a visual attribute of each screen element in the play screen, where the visual attribute includes a dimension of the screen element; and calculating an area proportion based on the dimension of the screen element.

In a possible design of the third aspect, the preset condition further includes that: the second dynamic element is located at an edge of the play screen, and the visual attribute further includes coordinates of a start point of the screen element in the play screen.

When the computer instructions are executed by the processor, the electronic device is enabled to further perform the following step: after the obtaining a visual attribute of each screen element in the play screen, determining, based on the dimension of the screen element and the coordinates of the start point of the screen element in the play screen, whether the second dynamic element is located at the edge of the play screen.

In another possible design of the third aspect, when the computer instructions are executed by the processor, the electronic device is enabled to further perform the following steps: if a first picture drawn by the electronic device in response to the j-th periodic signal includes the picture of the first dynamic element, adding a first icon, where the first icon is used to indicate that the picture of the first dynamic element is drawn in response to the j-th periodic signal; and if the first picture drawn by the electronic device in response to the j-th periodic signal does not include the picture of the first dynamic element, adding a second icon, where the second icon is used to indicate that the picture of the first dynamic element is not drawn in response to the j-th periodic signal; where j is an integer, and j takes a value in {1, 2, 3, 4 . . . } in sequence.

According to a fourth aspect, this application provides a system on chip, where the system on chip is applied to an electronic device; the system on chip includes one or more interface circuits and one or more processors; the interface circuit and the processor are interconnected by a line; and the interface circuit is configured to receive signals from a memory of the electronic device and send the signals to the processor, where the signals include computer instructions stored in the memory. When the computer instructions are executed by the processor, the electronic device performs the method according to any one of the first aspect and the possible designs thereof.

According to a fifth aspect, this application provides a computer-readable storage medium, where the computer-readable storage medium includes computer instructions, and when the computer instructions are executed on an electronic device, the electronic device is enabled to perform the method according to any one of the first aspect and the possible designs thereof.

According to a sixth aspect, this application provides a computer program product, where when the computer program product runs on an electronic device, the electronic device is enabled to perform the method according to any one of the first aspect and the possible designs thereof.

It can be understood that for the beneficial effects that can be achieved by the electronic device according to any one of the second aspect and the possible designs thereof and any one of the third aspect and the possible designs thereof, the system on chip according to the fourth aspect, the computer-readable storage medium according to the fifth aspect, the computer program product according to the sixth aspect, reference may be made to the beneficial effects in any one of the first aspect and the possible designs thereof, which is not repeated herein.

BRIEF DESCRIPTION OF DRAWINGS

FIG. 9A is Flowchart 1 of a method for displaying a play screen according to an embodiment of this application;

DESCRIPTION OF EMBODIMENTS

Hereinafter, the terms "first" and "second" are merely intended for a purpose of description, and shall not be understood as an indication or implication of relative importance or an implicit indication of the number of the indicated technical features. Therefore, a feature limited by "first" or "second" may explicitly or implicitly include one or more features. In the descriptions of the embodiments, "plurality" means two or more, unless otherwise specified.

The following describes implementations of the embodiments in detail with reference to the accompanying drawings.

For example, the method for displaying a play screen provided in the embodiments of this application can be applied to electronic devices such as mobile phones, tablet computers, notebook computers, ultra-mobile personal computers (ultra-mobile personal computer, UMPC), handheld computers, netbooks, wearable electronic devices, and virtual reality devices, and the embodiments of this application impose no limitations on this.

Figure 1:
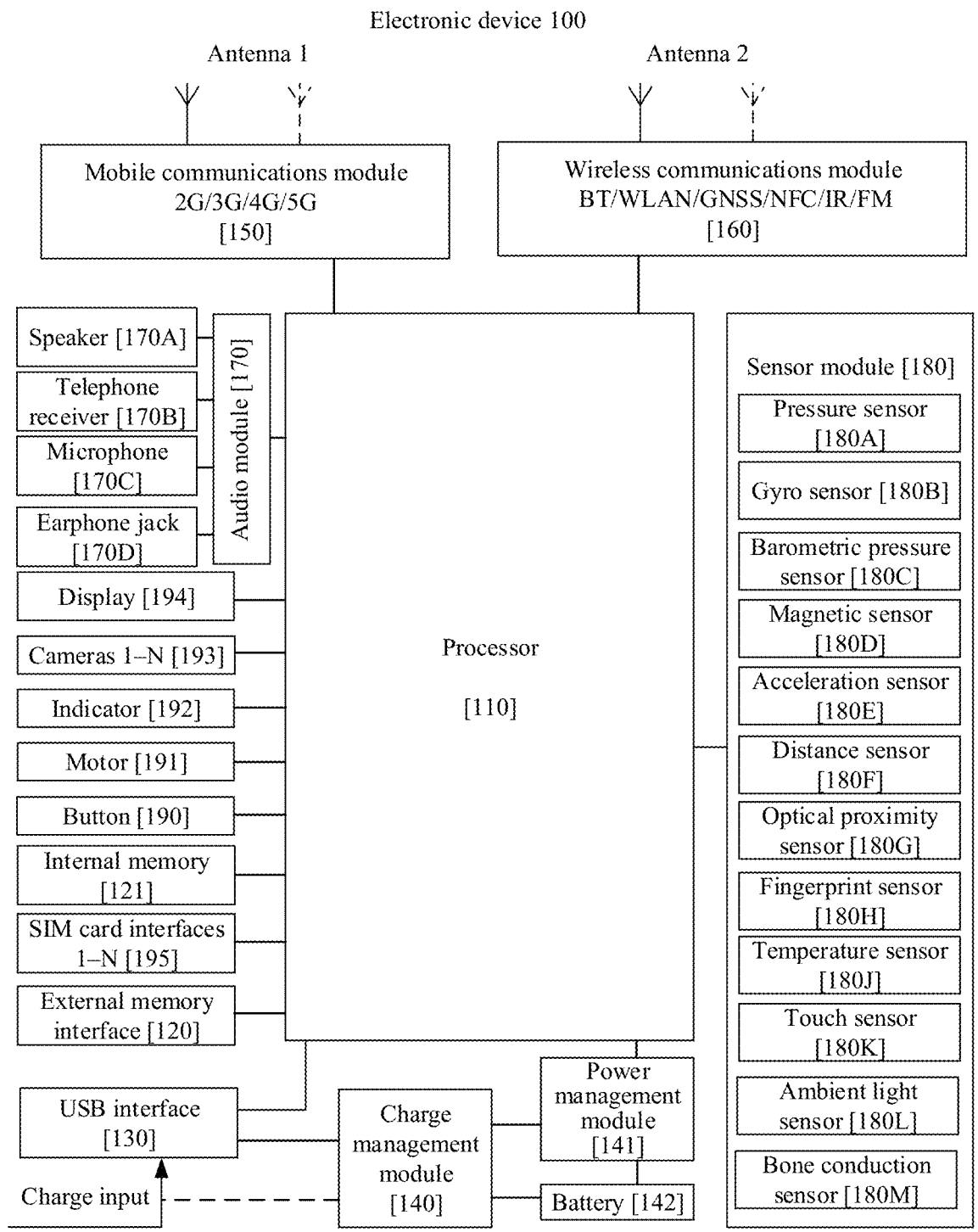
FIG. 1 is a schematic diagram of a hardware structure of an electronic device according to an embodiment of this application.

FIG. 1 is a schematic structural diagram of an electronic device 100 according to an embodiment of this application.

As shown in FIG. 1, the electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identification module (subscriber identification module, SIM) card interface 195, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment does not constitute a specific limitation on the electronic device 100. In some other embodiments, the electronic device 100 may include more or fewer components than shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate devices or may be integrated into one or more processors.

The controller may be a nerve center and command center of the electronic device 100. The controller may generate an operation control signal according to instruction operation code and a timing signal to complete control of instruction fetching and execution.

The processor 110 may be further provided with a memory for storing instructions and data. In some embodiments, the memory in the processor 110 is a cache memory. The memory may store instructions or data just used or repeatedly used by the processor 110. If the processor 110 needs to use the instructions or data again, the processor 110 may directly invoke the instructions or data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules illustrated in this embodiment is merely an example for description, and constitutes no limitation on the structure of the electronic device 100. In some other embodiments, the electronic device 100 may alternatively use an interface connection manner different from those in the foregoing embodiments or a combination of a plurality of interface connection manners.

The charge management module 140 is configured to receive charging input from a charger. When charging the battery 142, the charge management module 140 may further supply power to the electronic device by using the power management module 141.

The power management module 141 is configured to connect the battery 142, the charge management module 140, and the processor 110. The power management module 141 receives input from the battery 142 and/or the charge management module 140 to supply power to the processor 110, the internal memory 121, an external memory, the display 194, the camera 193, the wireless communications module 160, and the like. In some other embodiments, the power management module 141 may alternatively be disposed in the processor 110. In some other embodiments, the power management module 141 and the charge management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the electronic device 100 may be configured to cover one or more communication bands. Different antennas may be further reused for increasing antenna utilization. For example, the antenna 1 may be reused as a diversity antenna of a wireless local area network.

The mobile communications module 150 may provide a wireless communication solution including 2G/3G/4G/5G and the like to be applied to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit the processed electromagnetic wave to the modem processor for demodulation. The mobile communications module 150 may further amplify a signal modulated by the modem processor, and convert the signal into an electromagnetic wave and radiate the electromagnetic wave by using the antenna 1.

The modem processor may include a modulator and a demodulator. The modulator is configured to modulate a low frequency baseband signal that is to be sent into a medium or high frequency signal. The demodulator is configured to demodulate a received electromagnetic wave signal into a low frequency baseband signal. Then, the demodulator sends the low frequency baseband signal obtained through demodulation to the baseband processor for processing. After being processed by the baseband processor, the low frequency baseband signal is transferred to the application processor. The application processor outputs a sound signal by using an audio device (not limited to the speaker 170A, the telephone receiver 170B, and the like), or displays an image or a video by using the display 194.

The wireless communications module 160 may provide a wireless communication solution applied to the electronic device 100 and including a wireless local area network (wireless local area networks, WLAN) (for example, wireless fidelity (wireless fidelity, Wi-Fi) network), Bluetooth (bluetooth, BT), global navigation satellite system (global navigation satellite system, GNSS), frequency modulation (frequency modulation, FM), near field communication (near field communication, NFC), infrared (infrared, IR), and the like. The wireless communications module 160 may be one or more devices integrating at least one communication processing module. The wireless communications module 160 receives an electromagnetic wave by using the antenna 2, performs frequency modulation and filtering processing on the electromagnetic wave signal, and transmits the processed signal to the processor 110. The wireless communications module 160 may further receive a to-be-sent signal from the processor 110, perform frequency modulation and amplification on the signal, and convert the signal into an electromagnetic wave and radiate the electromagnetic wave by using the antenna 2.

In some embodiments, in the electronic device 100, the antenna 1 is coupled to the mobile communications module 150, and the antenna 2 is coupled to the wireless communications module 160, so that the electronic device 100 can communicate with a network and other devices by using a wireless communications technology. The wireless communications technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR technology, and/or the like. The GNSS may include the global positioning system (global positioning system, GPS), the global navigation satellite system (global navigation satellite system, GLONASS), the Beidou navigation satellite system (beidou navigation satellite system, BDS), the quasi-zenith satellite system (quasi-zenith satellite system, QZSS), and/or the satellite based augmentation systems (satellite based augmentation systems, SBAS).

The electronic device 100 implements a display function by using the GPU, the display 194, the application processor, and the like. The GPU is an image processing microprocessor and is connected to the display 194 and the application processor. The GPU is configured to perform mathematical and geometric computation graphics rendering. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), a light-emitting diode (light-emitting diode, LED), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like.

If a touch sensor 180K is integrated in the display 194 in this embodiment of this application, the display 194 may be referred to as a touchscreen. The touch sensor 180K may also be called a "touch panel". In other words, the display 194 may include a display panel and a touch panel. The touch sensor 180K is configured to detect a touch operation performed on or near the touch sensor 180K. After detecting the touch operation, the touch sensor 180K may trigger a driver of a kernel layer (such as a TP driver) to periodically scan a touch parameter generated by the touch operation. The driver of the kernel layer then transmits the touch parameter to a relevant module in an upper layer, so that the relevant module determines a touch event corresponding to the touch parameter.

In addition, the display 194 may provide visual output related to the touch operation. In some other embodiments, the touch sensor 180K may alternatively be disposed on a surface of the electronic device 100 instead of being integrated in the display 194. In this case, positions of the touch sensor 180K and the display 194 may be different. In this embodiment of this application, a display integrated with a touch sensor is used as an example of the display, and the specific process of the method for displaying a play screen is described.

The electronic device 100 may implement a shooting function by using the ISP, the camera 193, the video codec, the GPU, the display 194, the application processor, and the like. The ISP is configured to process data fed back by the camera 193. The camera 193 is configured to capture a static image or a video. The digital signal processor is configured to process digital signals, including not only digital image signals but also other digital signals. The video codec is configured to compress or decompress a digital video. The electronic device 100 may support one or more types of video codecs, so that the electronic device 100 can play or record videos in a plurality of coding formats such as moving picture experts group (moving picture experts group, MPEG) 1, MPEG2, MPEG3, and MPEG4.

The NPU is a neural-network (neural-network, NN) computing processor. By referring to a structure of a biological neural network, for example to a transmission mode between neurons in a human-brain, the NPU quickly processes input information and is also capable of continuous self-learning. Applications such as intelligent cognition of the electronic device 100, for example, image recognition, face recognition, speech recognition, and text understanding, can be implemented by using the NPU.

The external memory interface 120 may be configured to connect an external storage card, for example, a micro SD card, to extend a storage capacity of the electronic device 100. The external memory card communicates with the processor 110 by using the external memory interface 120 to implement a data storage function. For example, files such as music and video files are stored in the external storage card. The internal memory 121 may be configured to store computer executable program code, where the executable program code includes instructions. By running the instructions stored in the internal memory 121, the processor 110 executes various functional applications and data processing of the electronic device 100. For example, in this embodiment of this application, the processor 110 may execute instructions stored in the internal memory 121, and the internal memory 121 may include a program storage area and a data storage area. The program storage area may store an operating system, an application program required by at least one function (for example, a sound playing function or an image playing function), and the like. The data storage area may store data (such as audio data and a phone book) and the like that are created during use of the electronic device 100. In addition, the internal memory 121 may include a high-speed random access memory, and may further include a non-volatile memory, for example, at least one magnetic disk storage device, a flash memory device, and a universal flash storage (universal flash storage, UFS).

The electronic device 100 may use the audio module 170, the speaker 170A, the telephone receiver 170B, the microphone 170C, the earphone jack 170D, the application processor, and the like to implement an audio function, for example, music playing and sound recording.

The audio module 170 is configured to convert digital audio information into an analog audio signal for output, and is also configured to convert analog audio input into a digital audio signal. The audio module 170 may be further configured to encode and decode audio signals. The speaker 170A, also referred to as a "loudspeaker", is configured to convert audio electrical signals into sound signals. The telephone receiver 170B, also referred to as an "earpiece", is configured to convert audio electrical signals into sound signals. The microphone 170C, also referred to as a "mic" or "mike", is configured to convert sound signals into electrical signals. The earphone jack 170D is configured to connect a wired earphone.

The button 190 includes a power on/off button, a volume button, and the like. The button 190 may be a mechanical button, or may be a touch button. The electronic device 100 may receive button input and generate button signal input related to user setting and function control of the electronic device 100. The motor 191 may generate vibration alerts. The motor 191 may be configured to provide a vibration alert for an incoming call, and may also be configured to provide a vibration feedback for a touch. The indicator 192 may be an indicator lamp and may be configured to indicate a state of charge and power change, and may also be configured to indicate a message, a missed call, a notification, and the like. The SIM card interface 195 is configured to connect a SIM card. The SIM card may be inserted into the SIM card interface 195 or pulled out of the SIM card interface 195 to achieve contact with or separation from the electronic device 100. The electronic device 100 may support one or N SIM card interfaces, where N is a positive integer greater than 1. The SIM card interface 195 may support a nano SIM card, a micro SIM card, a SIM card, and the like.

The methods in the following embodiments can be all implemented in the electronic device 100 having the foregoing hardware structure.

Generally, an application screen of an APP may include one or more screen elements. The screen element includes a static element and a dynamic element. The static element is a screen element that remains unchanged in the application screen. The dynamic element is a screen element that is updated and changed in the application screen in a play state. The dynamic element may include: a video element, a dynamic like element, a dynamic text display element, and a dynamic music play element.

A dynamic element that occupies a small area in the application screen may be referred to as a small animation element. For example, the dynamic like element and the dynamic music play element may all be called small animation elements.

Specifically, an update frequency of an application screen may be referred to as a screen refresh rate. An update frequency of a dynamic element in an application screen to which the dynamic element belongs may be referred to as a frame rate. An electronic device may use different frame rates to update different dynamic elements in an application screen. In this way, each frame of updated application screen shows different updated dynamic elements. For example, a frame rate at which the electronic device updates a video element may be 30 hertz (Hz) or 60 Hz. A frame rate at which the electronic device updates a small animation element may be 60 Hz.

Figure 2:
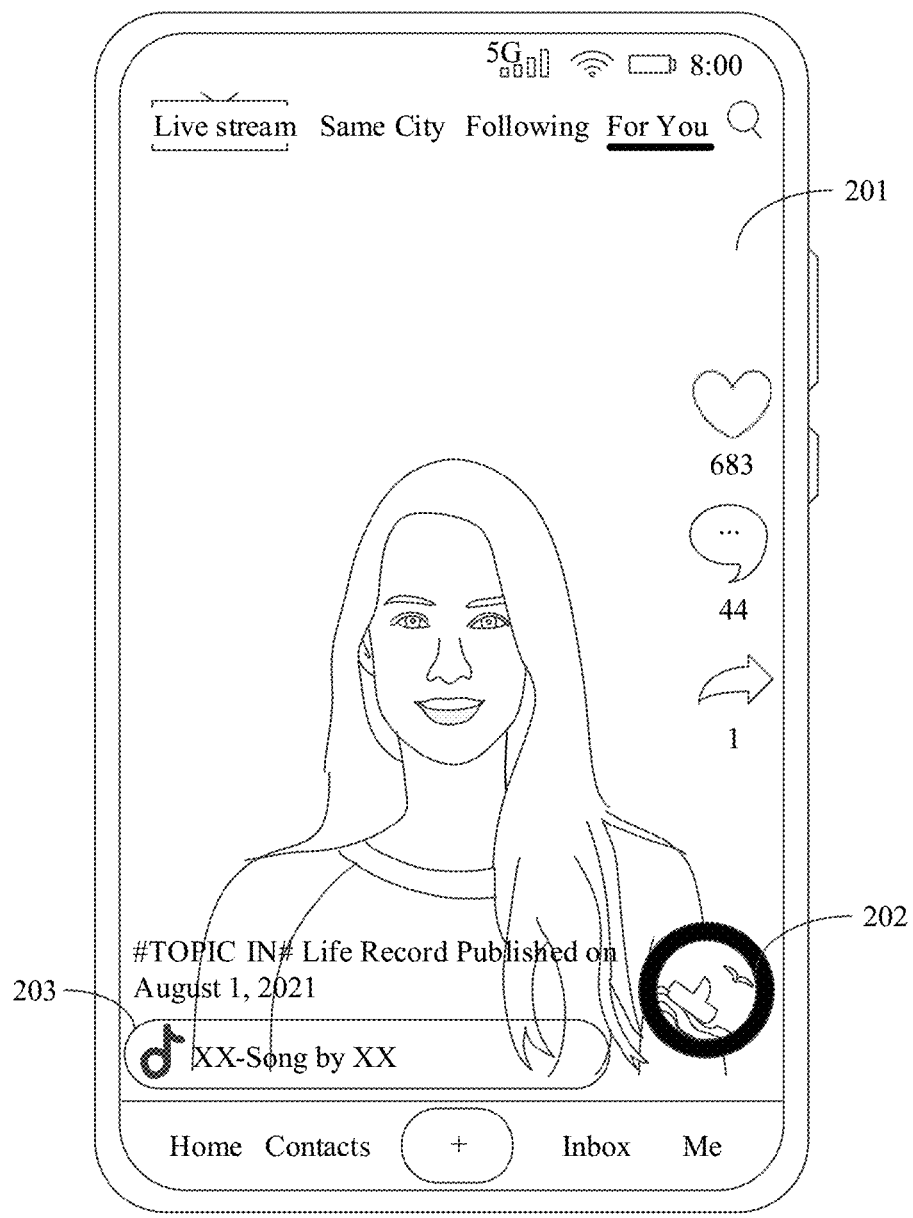
FIG. 2 is a schematic diagram of a short video play screen according to an embodiment of this application.

For example, a play screen in a short video APP is used as an example. As shown in FIG. 2, the play screen includes a plurality of static elements and a plurality of dynamic elements. The plurality of static elements may include a live streaming option, a same-city option, a following option, and the like. The live streaming option is used to trigger to jump to a live streaming interface. The same-city option is used to trigger to display short videos published by other users who are in the same city as a currently logged-in user. The following option is used to trigger to follow an account of a publisher of a short video displayed in the foreground. The plurality of dynamic elements include a video 201, a dynamic music play element 202, and a dynamic song information display element 203. A frame rate of the video 201 may be 30 Hz. Both a frame rate of the dynamic music play element 202 and a frame rate of the dynamic song information display element 203 may be 60 Hz.

Figure 3:
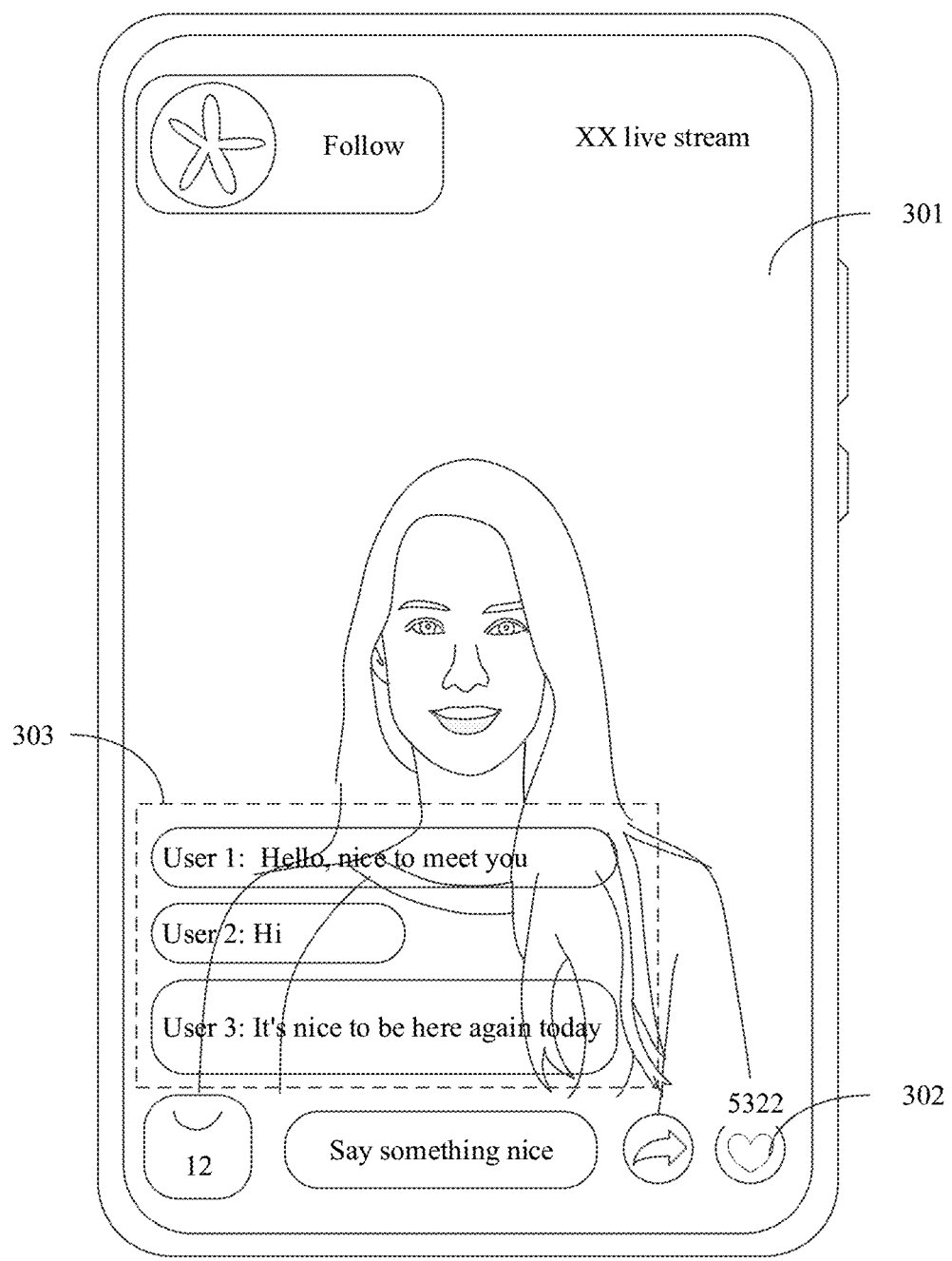
FIG. 3 is a schematic diagram of a live streaming screen according to an embodiment of this application.

For example, a play screen in a live streaming APP is used as an example. As shown in FIG. 3, the play screen includes a plurality of static elements and a plurality of dynamic elements. The plurality of static elements may include a follow option, a chat option, a forwarding option, and the like. The follow option is used to trigger to follow an account of a publisher of a short video displayed in the foreground. The chat option is used to trigger to input information and to display the input information. The forwarding option is used to trigger to forward a currently displayed live video to another user. The plurality of dynamic elements include a live video 301, a dynamic gift display element 302, and a dynamic dialog display element 303. A frame rate of the live video 301 may be 30 Hz. Both a frame rate of the dynamic gift display element 302 and a frame rate of the dynamic dialog display element 303 may be 60 Hz.

Figure 4:
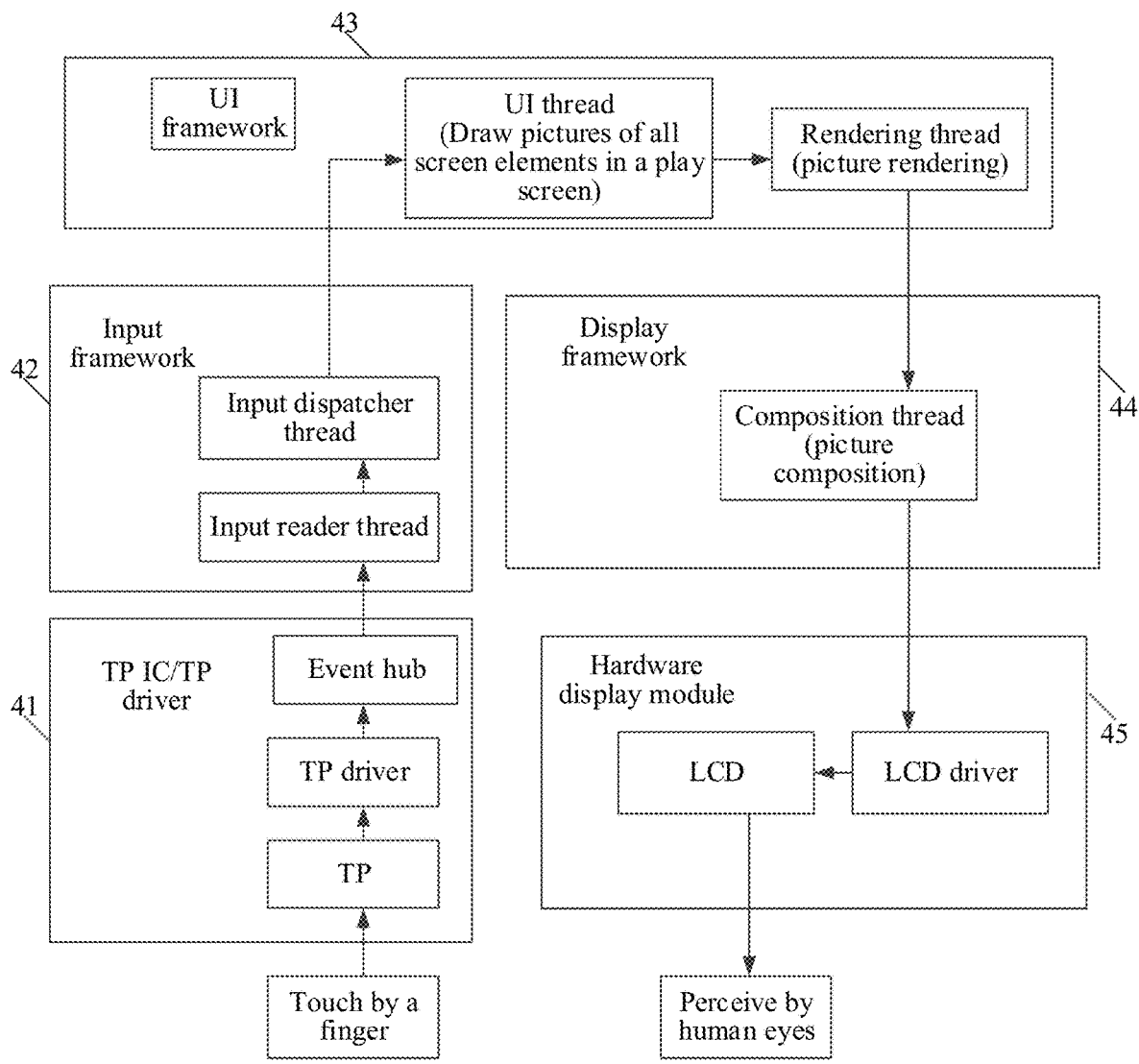
FIG. 4 is a schematic software processing flowchart of displaying a screen by an electronic device in response to a touch operation according to an embodiment of this application.

FIG. 4 is a schematic software processing flowchart of the electronic device from "a user inputs a touch operation on the display by using a finger" to "an application screen corresponding to the touch operation and displayed by the display is perceived by human eyes". As shown in FIG. 4, the electronic device may include a touch panel (touch panel, TP)/TP driver (Driver) 41, an input framework (that is, Input Framework) 42, a UI framework (that is, UI Framework) 43, a display framework (that is, Display Framework) 44, and a hardware display module 45. The input framework may be referred to as an input framework, and the display frame may be referred to as a display framework.

As shown in FIG. 4, the software processing flow of the electronic device may include the following steps (1) to (5).

Step (1): After a TP in the TP IC/TP driver 41 captures a touch operation of a user's finger on the TP of the electronic device, the TP driver reports a corresponding touch event to an event hub (event registration center). Step (2): An input reader thread (input reader thread) of the input framework 42 may read the touch event from the event hub and send the touch event to the input dispatcher thread (input dispatcher thread); and the input dispatcher thread reports the touch event to a UI thread (for example, DoFrame) in the UI framework 43. Step (3): The UI thread in the UI framework 43 draws one or more pictures corresponding to the touch event; and a rendering thread (for example, DrawFrame) performs picture rendering on the one or more pictures to obtain rendered picture(s) (for example, surface). Step (4): A composition thread in the display framework 44 composites the rendered picture(s) to obtain application screen(s). Step (5): A liquid crystal display (Liquid Crystal Display, LCD) of the hardware display module 45 drives the application screen that can accept composition, and the LCD displays a composited application screen. The LCD displays the application screen, and images displayed by the LCD can be perceived by human eyes.

Figure 5:
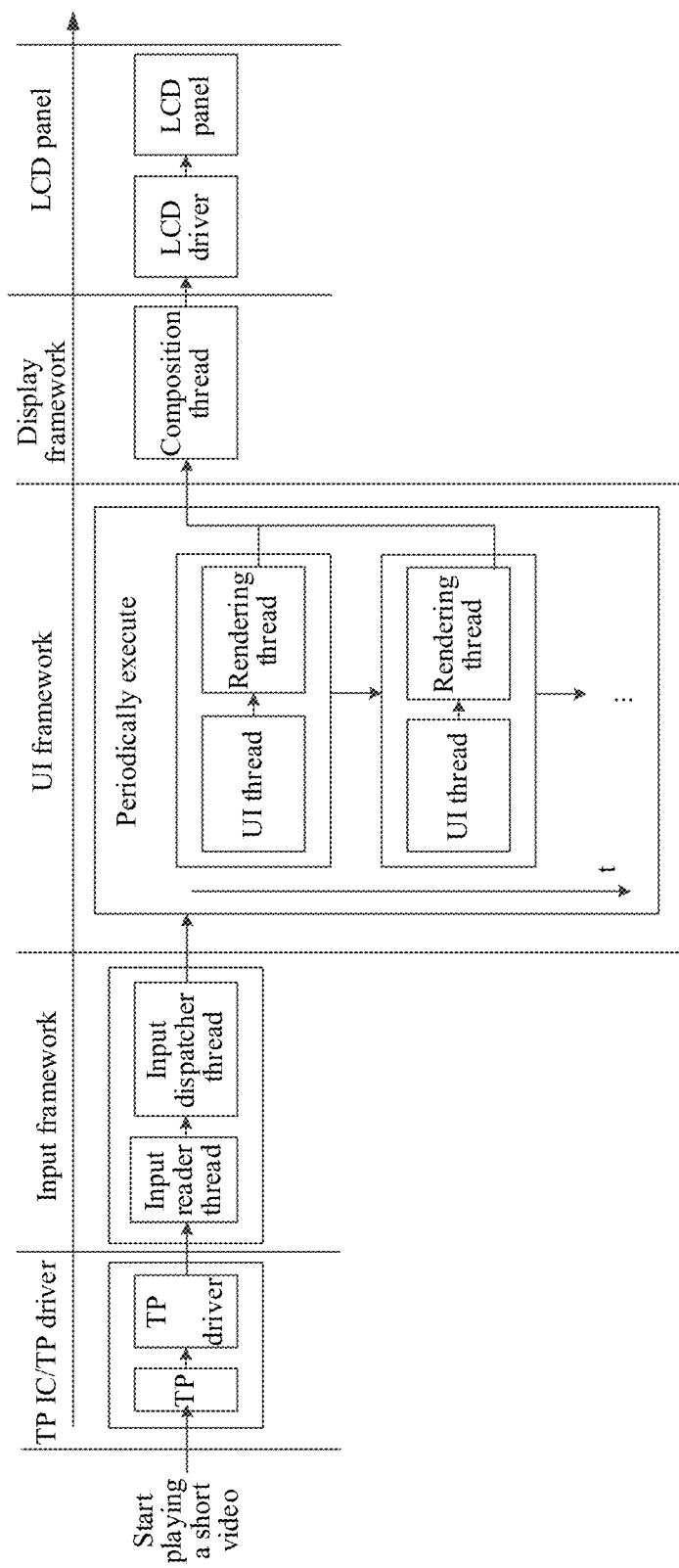
FIG. 5 is a schematic software processing flowchart of displaying a play screen by an electronic device in response to a touch operation according to an embodiment of this application.

A play screen of a short video APP is used as an example of the foregoing application screen. As shown in FIG. 5, the foregoing touch operation may be an operation of a user to start playing a short video. The foregoing UI thread is used to draw a picture of a screen element in the play screen of the short video APP; the rendering thread then renders pictures of all screen elements in the play screen to obtain play pictures; and the composition thread composites the play pictures to obtain a play screen. The UI thread may be referred to as a UI thread corresponding to the short video APP; and the rendering thread may be referred to as a rendering thread corresponding to the short video APP. Moreover, after receiving the touch operation, the electronic device may periodically execute the UI thread and the rendering thread for compositing a new play screen.

All static elements in the play screen remain unchanged in an update procedure of the play screen, and therefore in response to a touch event, the electronic device may draw pictures of all the static elements in the play screen only during the first execution of the UI thread. Furthermore, during the second and subsequent executions of the UI thread, the electronic device may no longer repeatedly draw the pictures of all the static elements in the play screen, but replicate the pictures of the static elements drawn before.

In addition, the electronic device may update different dynamic elements in the play screen by using different frame rates, and therefore the electronic device shows different updated dynamic elements in each updated frame of play screen. In this way, the electronic device also draws different pictures of the dynamic elements during each execution of the UI thread. Specifically, during each execution of the UI thread, the electronic device may draw pictures of some dynamic elements in the play screen and replicate pictures of some other dynamic elements drawn before.

It should be noted that, in addition to the UI thread and the rendering thread corresponding to the APP, the UI framework may also include a UI thread and rendering thread corresponding to a status bar, and/or a UI thread and rendering thread corresponding to a message prompt box. In a case that a picture corresponding to the status bar and a picture corresponding to the message prompt box are obtained by drawing and rendering, the composition thread composites the play pictures, the picture corresponding to the status bar and the picture corresponding to the message prompt box to obtain a play screen. In this case, the play screen not only includes screen elements, but also includes a status bar and a message prompt box. In this embodiment of this application, the specific process of the method for displaying a play screen is described by using an example in which the composition thread composites the play pictures to obtain the play screen.

Figure 6:
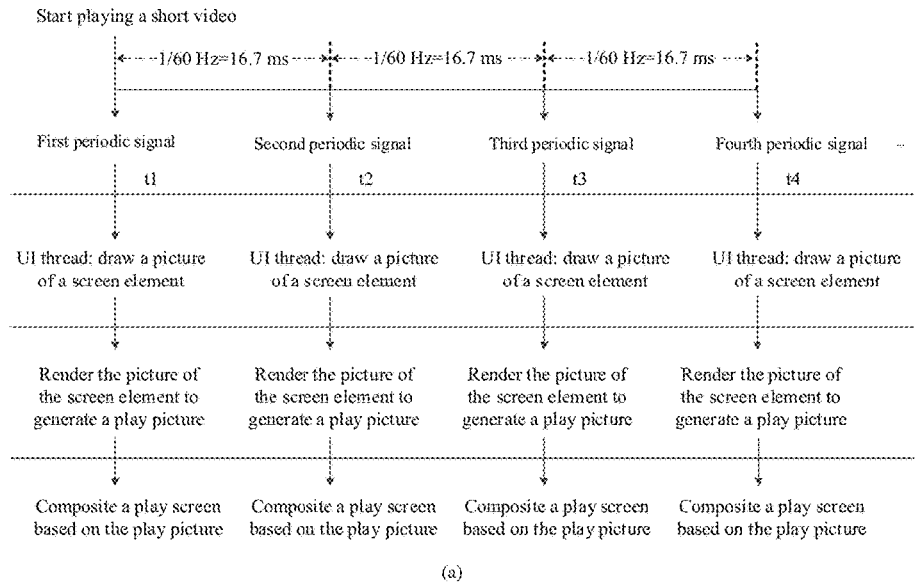
FIG. 6 is a refresh flowchart of a short video play screen by using a conventional technology according to an embodiment of this application.
Figure 6:
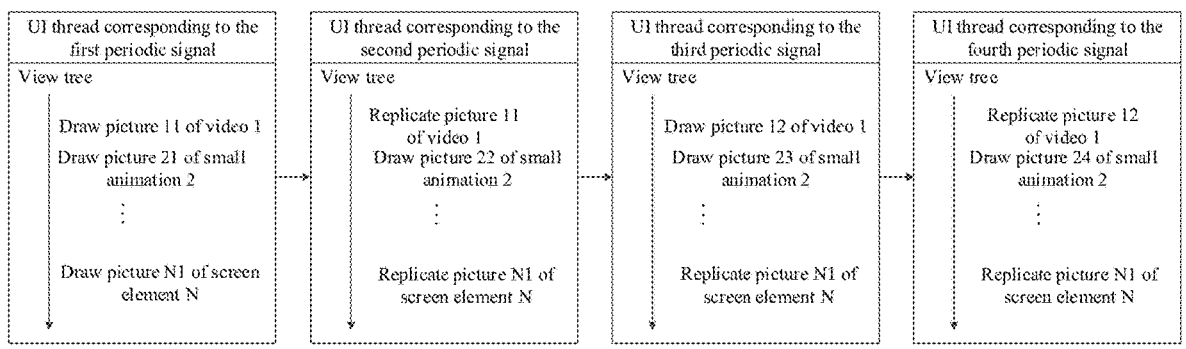

For example, as shown in (a) of FIG. 6, there is one periodic signal (for example, the first periodic signal or the second periodic signal) every two signal periods. The periodic signal may be used to trigger to draw one or more pictures. The signal period may be a reciprocal of a maximum screen refresh rate that may be used by the display of the electronic device, for example, 1/60 Hz=16.7 milliseconds (ms).

In response to the user's operation to start playing a short video, the UI framework in the electronic device may call a UI thread to draw a picture of a screen element in the play screen at the moment when each periodic signal arrives. Then, the electronic device sends pictures of all screen elements in the play screen to a graphics processing unit (Graphics Processing Unit, GPU). The GPU calls a rendering thread to render the pictures of all the screen elements in the play screen to obtain rendered pictures. Then, a hardware compositor (Hardware Composer, HWC) may call a composition thread to composite the rendered pictures to obtain a play screen. Finally, a hardware display module may display the play screen on the LCD.

It should be noted that the periodic signal may be named differently in different systems or architectures. For example, in some systems or architectures, the periodic signal may be named a vertical synchronization signal (VSYNC_APP). However, no matter what the periodic signal is named, as long as a signal has similar functions and conforms to the technical solution of the method provided in the embodiments of this application, it should fall within the protection scope of this application.

For example, the play screen may include screen element 1, screen element 2, . . . , and screen element N, where N is a positive integer greater than 2. It is assumed that screen element 1 is video 1, screen element 2 is small animation 2, and screen element 3 to screen element N are all static elements. Herein, that a frame rate of updating video 1 by the electronic device is 30 Hz, and that a frame rate of updating small animation 2 by the electronic device is 60 Hz (that is) are used as an example to describe the specific procedure of updating different screen elements in each UI thread by the electronic device.

As shown in (b) of FIG. 6, at time t1, the electronic device executes a UI thread corresponding to a foreground application in response to the first periodic signal, where the UI thread includes a view tree (view tree). The UI thread includes: drawing picture 11 of video 1, drawing picture 21 of small animation 2, . . . , and drawing picture N1 of screen element N. To be specific, the electronic device draws pictures of all screen elements in a play screen in a first-drawing procedure. Then, at time t2, the electronic device executes the UI thread in response to the second periodic signal, where the UI thread includes: replicating picture 11 of video 1, drawing picture 22 of small animation 2, . . . , and replicating picture N1 of screen element N. An interval between time t1 and time t2 is equal to one signal period. Similarly, the electronic device executes the UI thread in response to the third periodic signal at time t3, and then executes the UI thread in response to the fourth periodic signal at time t4.

The UI thread executed in response to the third periodic signal includes: drawing picture 12 of video 1, drawing picture 23 of small animation 2, . . . , and replicating picture N1 of the screen element N. The UI thread executed in response to the forth periodic signal includes: replicating picture 12 of video 1, drawing picture 24 of small animation 2, ..., and replicating picture N1 of the screen element N. The foreground application is an application corresponding to a screen currently displayed on the display of the electronic device.

It can be learned that the electronic device draws the picture of video 1 every two signal periods based on the frame rate of updating video 1. The electronic device draws the picture of small animation 2 every two signal periods based on the frame rate of updating small animation 2.

At present, in the related art, to reduce power consumption of an electronic device, the electronic device typically discards an updated frame of play screen at regular intervals (that is, to reduce a screen refresh rate). In this way, the power consumption of the electronic device in displaying the play screen can be reduced by reducing the refresh rate of the play screen. However, because the discarded updated frame of play screen may include an updated picture of a dynamic element, discarding of the updated frame of play screen causes the updated picture of the dynamic element not to be displayed. If a position or an area proportion of the dynamic element in the play screen is relatively prominent, it means that the dynamic element is a focus of a user. As a result, that the updated picture of the dynamic element is not displayed may be likely to cause play of the dynamic element to freeze.

Figure 7:
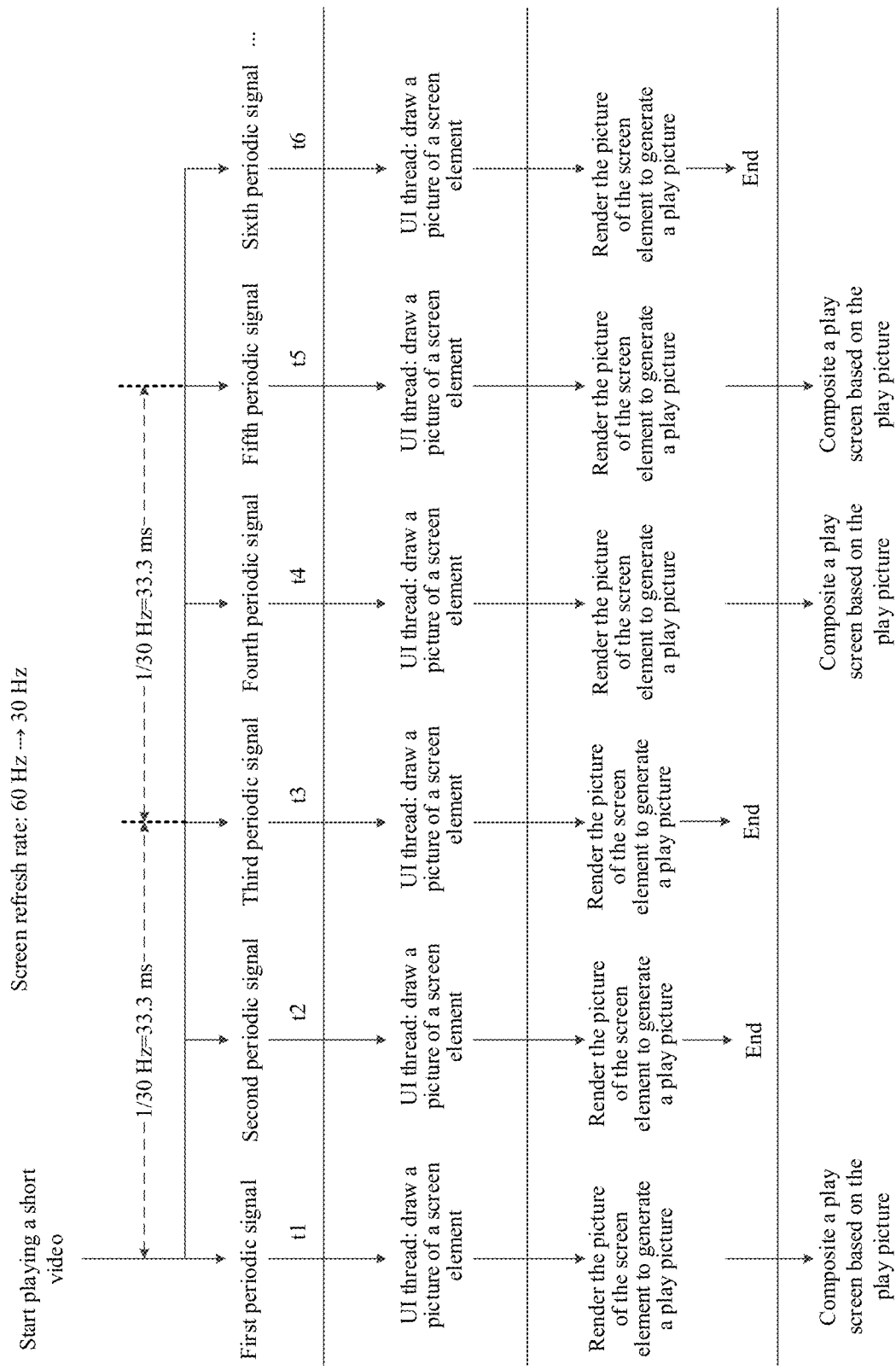
FIG. 7 is Refresh Flowchart 1 of a short video play screen according to an embodiment of this application.

For example, as shown in FIG. 7, to reduce the screen refresh rate from 60 Hz to 30 Hz, the electronic device randomly discards a play picture and does not display it within two foregoing signal periods (that is, a period with a length of 33.3 ms).

Figure 8:
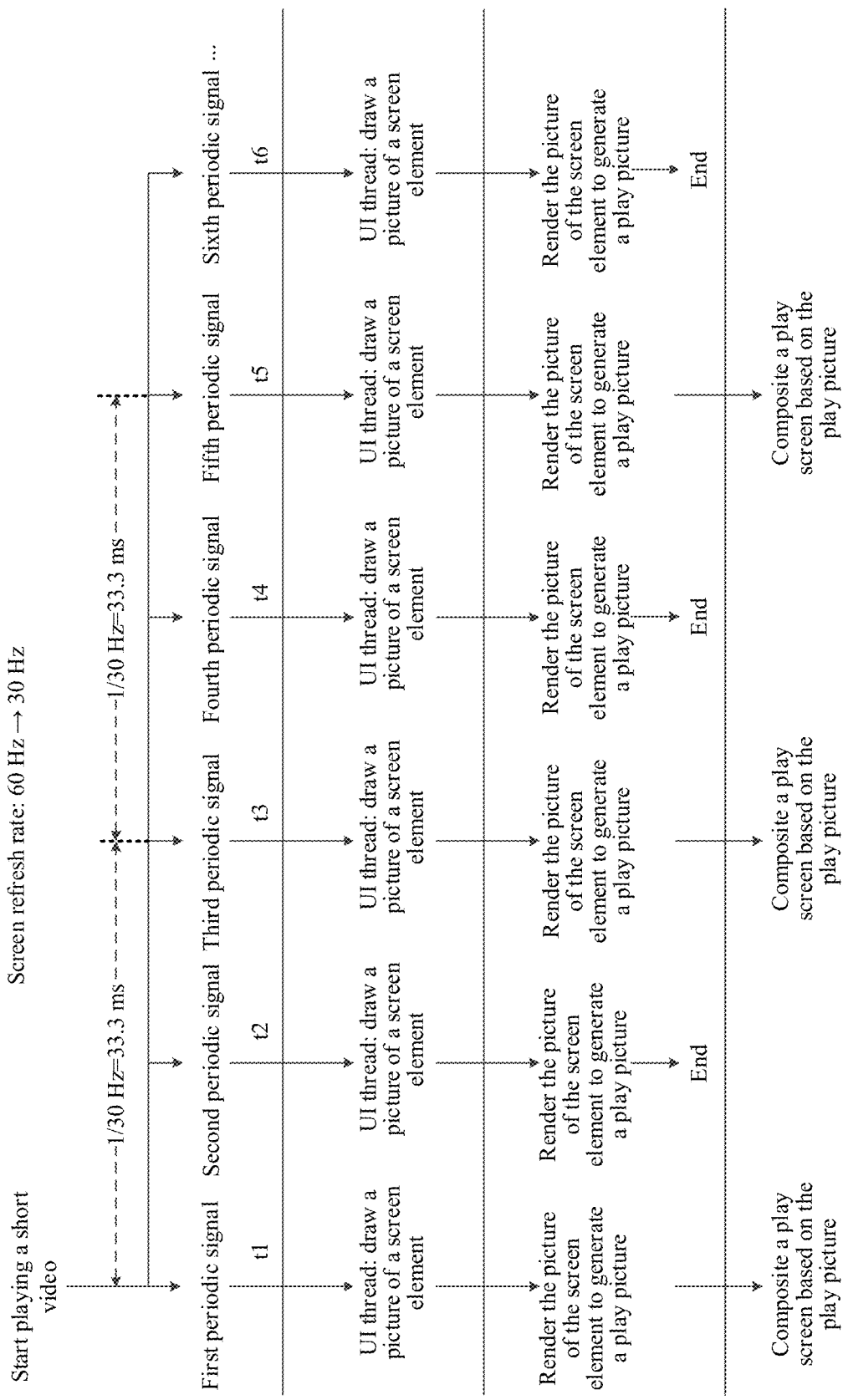
FIG. 8 is Refresh Flowchart 2 of a short video play screen according to an embodiment of this application.

For example, as shown in FIG. 8, to reduce the screen refresh rate from 60 Hz to 30 Hz, the electronic device may discard a play picture and not display it every two signal periods. In this way, one play picture is discarded within two signal periods (that is, a period with a length of 33.3 ms).

It can be understood that the related solution shown in FIG. 7 and the related solution shown in FIG. 8 both discard a generated play picture after drawing and rendering the picture. Therefore, a play screen including such play picture is not generated and displayed. Although the power consumption of the electronic device in displaying the play screen including such play picture is avoided, power consumption in drawing and rendering such play picture still exists, which is still relatively large. Moreover, because the electronic device chooses to discard a play picture without considering an updated picture of a screen element that is included in the play picture, the play picture may include an updated picture of video 1, for example, a play picture generated by rending a picture generated by UI thread 3. However, an area proportion of video 1 in the play screen accounts for nearly 100%. Discarding of the play picture causes the updated picture of video 1 not to be displayed, which causes play of video 1 to freeze.

For the problems in the foregoing related solutions that power consumption of reducing a screen refresh rate is relatively large and that play of a dynamic element in a screen freezes, an embodiment of this application proposes a method for displaying a play screen. An electronic device may determine, based on an area proportion of a dynamic element in a play screen, a first dynamic element that is a focus of a user and a second dynamic element that is not a focus of a user. Then, the electronic device determines a dynamic element whose picture is drawn in each drawing procedure (which may be referred to as an updated dynamic element). If the dynamic element updated in the drawing procedure does not include the first dynamic element, the updated dynamic element is not a focus of the user, and the picture may not be rendered, that is, an updated picture of the dynamic element is not displayed. Because procedures such as rendering, composition, and displaying are not performed after the drawing procedure, power consumption generated in multiple procedures such as rendering, composition, and displaying can be avoided, thereby reducing the power consumption of the electronic device. In addition, since the updated picture of the dynamic element is not displayed, and the updated dynamic element is not the focus of the user, the user finds that the play of the dynamic element has a low probability of freezing, in other words, the possibility of freezing in play of the dynamic element is reduced.

The method for displaying a play screen provided in this embodiment of this application may be used for an electronic device to display a play screen of a foreground application. A screen element in the play screen of the foreground application includes a first dynamic element, and the first dynamic element has a first frame rate. As shown in FIG. 9A, the method may include steps S901 and S902.

S901: The electronic device determines whether the screen element in the play screen includes a second dynamic element, where the second dynamic element has a second frame rate, and a preset condition includes that: an area proportion of the second dynamic element in the play screen is less than a preset threshold, and the second frame rate is greater than the first frame rate; and the second dynamic element satisfies the preset condition.
The electronic device may determine whether the screen element in the play screen includes the first dynamic element and the second dynamic element.

The electronic device has an application with a video play function installed. The electronic device may receive a first operation of the user to initiate the application and then run the application in the foreground in response to the first operation. This application is a foreground application. Then, the electronic device may receive a second operation of the user to start playing a video. In response to the second operation, the electronic device executes a drawing procedure when each periodic signal arrives. Then, the electronic device may render pictures of all screen elements in the play screen that are obtained in the drawing procedure to obtain play pictures. The electronic device then composites a new play screen based on the play pictures and stores the new play screen in a cache. An LCD driver of the electronic device reads the new play screen from the cache and displays it.

In response to the second operation, the electronic device may further determine whether the screen element in the play screen includes the first dynamic element and the second dynamic element. Specifically, the electronic device may determine whether a dynamic element of the play screen includes the first dynamic element and the second dynamic element.

The electronic device may determine that the screen element in the play screen includes one or more second dynamic elements. The electronic device processes the second dynamic elements in the same way.

In some embodiments, the area proportion of the second dynamic element in the play screen is less than the preset threshold (for example, 5%), meaning that the second dynamic element occupies a relatively small area of the play screen, and therefore the second dynamic element is less attractive to the user. It can be learned from this that the user usually does not focus on the second dynamic element when watching the play screen.

For example, as shown in FIG. 2, the dynamic music play element 202 and the dynamic song information display element 203 in the play screen each occupies a small area in the play screen and is less attractive to the user. The video 201 in the play screen occupies a large area in the play screen, which is more attractive to the user, and therefore, the user usually focuses on the video 201 while viewing the play screen, instead of the dynamic music play element 202 and the dynamic song information display element 203. The video 201 is the first dynamic element, and the dynamic music play element 202 and the dynamic song information display element 203 are both the second dynamic elements.

For another example, as shown in FIG. 3, the live streaming video 301 in the play screen occupies a large area in the play screen, the dynamic dialog display element 303 occupies a relatively large area in the play screen, and the dynamic gift display element 302 occupies a small area in the play screen. Therefore, the user usually focuses on the live streaming video 301 and the dynamic dialog display element 303 while watching the play screen, instead of the dynamic gift display element 302. The live streaming video 301 and the dynamic dialog display element 303 are both the first dynamic elements, and the dynamic gift display element 302 is the second dynamic element.

In addition, because the second frame rate of the second dynamic element in the play screen is greater than the first frame rate of the first dynamic element, the electronic device may reduce the second frame rate of the second dynamic element. Since the focus is usually not on the second dynamic element, when the electronic device reduces the second frame rate of the second dynamic element, the user finds that a probability of freezing in play of the second dynamic element is low, that is, a probability of freezing in display of the play screen is reduced.

In some embodiments, the preset condition may further include that: a background color of an area in which the second dynamic element is located may alternatively be transparent, and/or the second dynamic element is located at an edge (for example, upper, bottom, right, and left) of the play screen.

It can be understood that the background color of the area in which the second dynamic element is located is transparent and the second dynamic element is located at an edge of the play screen, each meaning that the second dynamic element is less attractive to the user and that the user is more likely not to focus on the second dynamic element when watching the play screen. Therefore, if the electronic device reduces the frame rate of the second dynamic element that satisfies at least one of the following: the area proportion of the second dynamic element in the play screen is less than the preset threshold, the background color of the area in which the second dynamic element is located is transparent, and the second dynamic element is located at the edge of the play screen, the user finds that the probability of freezing in play of the second dynamic element is low.

In some embodiments, the first dynamic element does not satisfy the preset condition. That the first dynamic element does not satisfy the preset condition may mean that the first dynamic element does not satisfy all conditions included in the preset condition or does not satisfy at least one condition in the preset condition. For example, an area proportion of the first dynamic element in the play screen is greater than a preset threshold. That the area proportion of the first dynamic element in the play screen is greater than the preset threshold means that the first dynamic element occupies a larger area in the play screen, therefore the first dynamic element is more attractive to the user. It can be learned from this that the user usually focuses on the first dynamic element when watching the play screen. If the first frame rate of the first dynamic element is reduced, the user finds that a probability of freezing in play of the first dynamic element is high. Therefore, the electronic device displays each updated picture of the first dynamic element.

For example, the first dynamic element may include a video element; and the second dynamic element may be a small animation element.

S902: When the screen element in the play screen includes the second dynamic element, the electronic device displays the play screen of the foreground application at the first frame rate.

That the electronic device displays the play screen of the foreground application at the first frame rate may include: displaying a play screen generated based on a picture of the first dynamic element drawn in response to a periodic signal. To be specific, the play screen of the foreground application displayed at the first frame rate is a play screen including the updated picture of the first dynamic element. In this way, the first dynamic element is updated at the first frame rate of the first dynamic element.

Further, if the electronic device does not draw a picture of the first dynamic element in response to a periodic signal, the electronic device does not display a play screen generated based on the picture obtained in response to the periodic signal. Since the second frame rate of the second dynamic element is greater than the first frame rate of the first dynamic element, if the electronic device does not draw a picture of the first dynamic element in response to a periodic signal, the electronic device may draw a picture of the second dynamic element, but does not display the picture of the second dynamic element drawn in response to the periodic signal. In this way, the second frame rate of updating the second dynamic element is less than or equal to the first frame rate, which reduces the second frame rate of the second dynamic element.

It should be noted that the "displaying the play screen of the foreground application at the first frame rate" herein means that a screen refresh rate of the electronic device is adjusted to be equal to the first frame rate. The first frame rate may be less than the unadjusted screen refresh rate of the electronic device, in other words, the screen refresh rate of the electronic device is reduced. The unadjusted screen refresh rate is equal to a reciprocal of a signal period of the periodic signal.

In some embodiments, if the screen element in the play screen does not include a second dynamic element, the electronic device displays the play screen of the foreground application at an unadjusted screen fresh rate (that is, a reciprocal of a signal period of a periodic signal).

In some embodiments, the electronic device draws a first picture in response to the i-th periodic signal. In a case that the screen element in the play screen includes the first dynamic element and the second dynamic element, the electronic device determines whether the first picture includes a picture of the first dynamic element. If the first picture does not include the picture of the first dynamic element, the electronic device displays a play screen displayed corresponding to the (i−1)-th periodic signal. If the first picture includes the picture of the first dynamic element, the electronic device displays a play screen including the first picture.

i is an integer, and i takes a value in $\{2, 3, 4 \ldots\}$ in sequence. i may alternatively take a value of 1. When i is 1, the electronic device draws the first picture in response to the first periodic signal, and the first picture includes pictures of all screen elements in the play screen. All the screen elements in the play screen also include a static element.

If the first picture obtained by the electronic device in response to the i-th periodic signal does not include the picture of the first dynamic element, the electronic device displays a play screen displayed corresponding to the (i−1)-th periodic signal, meaning that the electronic device does not display the play screen generated based on the picture obtained in response to the i-th periodic signal.

Further, in response to the i-th periodic signal, in addition to drawing the first picture, the electronic device also replicates a second picture, where the second picture includes a picture of the static element. If the first picture includes the picture of the first dynamic element, the electronic device may display a play screen including the first picture and the second picture.

Figure 9B:
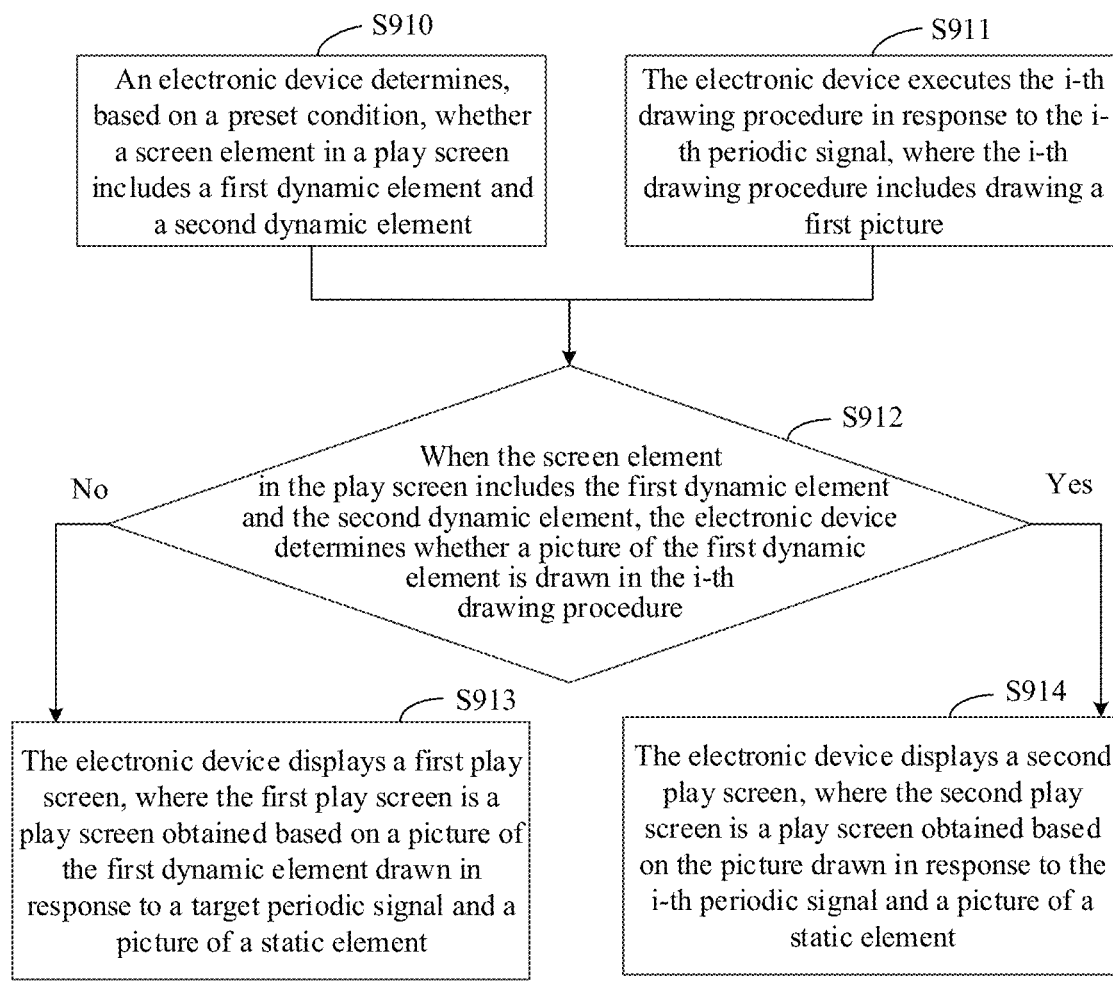
FIG. 9B is Flowchart 2 of a method for displaying a play screen according to an embodiment of this application.

In some embodiments, in response to the i-th periodic signal, the electronic device calls a UI thread corresponding to the foreground application to execute the i-th drawing procedure. By executing the i-th drawing procedure, the electronic device may obtain pictures of all screen elements in the play screen. By executing the i-th drawing procedure, the electronic device may draw pictures of some screen elements, and replicate pictures of some other screen elements drawn in response to the (i−1)-th periodic signal. The electronic device may continue to render the pictures obtained in the i-th drawing procedure when the first dynamic element is drawn in the i-th drawing procedure to obtain play pictures; and then obtain a play screen based on the play pictures. The electronic device may not display the pictures obtained in the i-th drawing procedure when the first dynamic element is not drawn in the i-th drawing procedure. As shown in FIG. 9B, S901 in the method may include S910, and S902 may include S911 to S914.

S910: The electronic device determines, based on the preset condition, whether the screen element in the play screen includes the first dynamic element and the second dynamic element.

S911: The electronic device executes the i-th drawing procedure in response to the i-th periodic signal, where the i-th drawing procedure includes drawing a first picture.

The i-th drawing procedure further includes replicating a second picture obtained in response to the (i−1)-th drawing procedure. The second picture includes the picture of the static element. The picture of the static element is drawn in response to the first drawing procedure.

In some embodiments, if the first picture does not include the picture of the first dynamic element, the second picture includes the picture of the first dynamic element. If the first picture includes the picture of the first dynamic element, the second picture does not include the picture of the first dynamic element. If the first picture does not include the picture of the second dynamic element, the second picture includes the picture of the second dynamic element. If the first picture includes the picture of the second dynamic element, the second picture does not include the picture of the second dynamic element.

In some embodiments, a reciprocal of a signal period of the i-th periodic signal is greater than the first frame rate of the first dynamic element. In this way, the electronic device may not draw the picture of the first dynamic element in response to some periodic signals, to be specific, the first picture does not include the picture of the first dynamic element. In addition, the second frame rate of the second dynamic element is greater than the first frame rate of the first dynamic element, meaning that the electronic device draws both the picture of the first dynamic element and the picture of the second dynamic element in response to a specific periodic signal. In this case, the first picture includes the picture of the first dynamic element and the picture of the second dynamic element.

For example, the second frame rate of the second dynamic element may be equal to the reciprocal of the signal period of the i-th periodic signal.

For example, the first frame rate of the first dynamic element may be equal to 24 Hz, 30 Hz, 60 Hz, or the like. The second frame rate of the second dynamic element may be equal to 60 Hz, 90 Hz, or 120 Hz. The signal period of the i-th periodic signal may be equal to $1/60$ ms, $1/90$ ms, or $1/120$ ms.

In some embodiments, the second frame rate of the second dynamic element is twice the first frame rate of the first dynamic element. When the reciprocal of the signal period of the i-th periodic signal is equal to the second frame rate of the second dynamic element, the first picture includes the picture of the second dynamic element.

The reciprocal of the signal period of the i-th periodic signal is equal to the second frame rate of the second dynamic element, meaning that the electronic device updates the picture of the second dynamic element at the moment when each periodic signal arrives. In addition, the second frame rate of the second dynamic element is twice the first frame rate of the first dynamic element, meaning that the electronic device updates the picture of the first dynamic element every two periodic signals.

In this way, in a case that the second frame rate of the second dynamic element is twice the first frame rate of the first dynamic element, and the reciprocal of the signal period of the i-th periodic signal is equal to the second frame rate of the second dynamic element, if the picture of the first dynamic element is drawn in response to the (i−1)-th periodic signal, the electronic device does not draw the picture of the first dynamic element but draws only the picture of the second dynamic element in response to the i-th periodic signal, and further replicates the picture of the first dynamic element drawn in response to the (i−1)-th periodic signal (to be specific, the first picture includes the picture of the second dynamic element, and the second picture includes the picture of the first dynamic element). If the picture of the first dynamic element is not drawn in response to the (i−1)-th periodic signal, the electronic device draws the picture of the first dynamic element and the picture of the second dynamic element in response to the i-th periodic signal (to be specific, the first picture including the picture of the first dynamic element and the picture of the second dynamic element).

In some embodiments, the reciprocal of the signal period of the i-th periodic signal is equal to m times the first frame rate of the first dynamic element, and m is a positive integer greater than 1. In this case, if the picture of the first dynamic element is drawn in the first period corresponding to the i-th periodic signal, the electronic device replicates the picture of the first dynamic element drawn in the first period (to be specific, the second picture includes the picture of the first dynamic element). If the picture of the first dynamic element is not drawn in the first period corresponding to the i-th periodic signal, the electronic device draws the picture of the first dynamic element in response to the i-th periodic signal (to be specific, the first picture includes the picture of the first dynamic element).

The first period refers to a reciprocal of the first frame rate of the first dynamic element. The first period is a period of drawing the first dynamic element.

For example, if the reciprocal of the signal period of the i-th periodic signal is equal to m times the first frame rate of the first dynamic element, the electronic device may update the picture of the first dynamic element every m−1 periodic signal(s).

For example, if m=4, the signal period of the i-th periodic signal is equal to 1/120 ms, and the first frame rate of the first dynamic element is equal to 30 Hz. A time range of a first period of the first dynamic element is from the start of the first periodic signal to the start of the fourth periodic signal, and a time range of a next first period is from the fourth periodic signal to the seventh periodic period, and a time range of a first period after the next first period is from the seventh periodic signal to the tenth periodic signal. The picture of the first dynamic element is only drawn once in each first period corresponding to the first dynamic element.

It should be noted that the reciprocal of the signal period of the i-th periodic signal may not be an integer multiple of the first frame rate of the first dynamic element. In this case, the electronic device updates the picture of the first dynamic element at unequal intervals.

In some embodiments, when the reciprocal of the signal period of the i-th periodic signal is greater than the second frame rate of the second dynamic element, and i takes some values, the electronic device draws the picture of the second dynamic element in response to the i-th periodic signal. When i takes the other values, the electronic device does not draw the picture of the second dynamic element in response to the i-th periodic signal.

S912: When the screen element in the play screen includes the first dynamic element and the second dynamic element, the electronic device determines whether a picture of the first dynamic element is drawn in the i-th drawing procedure.

That the electronic device determines whether the picture of the first dynamic element is drawn in the i-th drawing procedure is equivalent to determining whether the first picture includes the picture of the first dynamic element. If the picture of the first dynamic element is not drawn in the i-th drawing procedure, it means that the first picture does not include the picture of the first dynamic element, and the electronic device may execute S913. If the picture of the first dynamic element is drawn in the i-th drawing procedure, it means that the first picture includes the picture of the first dynamic element, and the electronic device may continue to render pictures and composite the pictures into a play screen, and execute S914.

S913: The electronic device displays a first play screen, where the first play screen is a play screen obtained based on a picture of the first dynamic element drawn in response to a target periodic signal and a picture of the static element.

If the electronic device determines that the picture of the first dynamic element is not drawn in the i-th drawing procedure, the electronic device may display a first play screen without rendering the pictures (including the first picture). If the electronic device does not render the pictures and does not generate a new play screen, the electronic device displays the play screen obtained in response to the target periodic signal before the i-th periodic signal (that is, the first play screen). The first play screen is a play screen displayed corresponding to the (i−1)-th periodic signal.

The target periodic signal is a periodic signal before the i-th periodic signal, which has the shortest time spacing with the i-th periodic signal, and corresponding to which the picture of the first dynamic element is drawn.

In some embodiments, in addition to displaying the first play screen, the electronic device may not render the pictures.

After executing the i-th drawing procedure in response to the i-th periodic signal, the electronic device may not render the pictures. It can be understood that the i-th drawing procedure does not include drawing the picture of the first dynamic element, meaning that the electronic device does not update the picture of the first dynamic element when executing the i-th drawing procedure and may update the picture of the second dynamic element. Based on the foregoing analysis of "the focus is usually on the first dynamic element", after executing the i-th drawing procedure in response to the i-th periodic signal, the electronic device may not continue to render the pictures. In this way, power consumption generated in rendering, composition, displaying, and other procedures can be avoided, thereby reducing power consumption of the electronic device.

For example, if the first frame rate of the first dynamic element is equal to 30 Hz, and the reciprocal of the signal period is equal to 1/60 ms, the electronic device executes the first drawing procedure in response to the first period signal and executes the second drawing procedure in response to the second period signal, where the second drawing procedure does not include drawing the picture of the first dynamic element; executes the third drawing procedure in response to the third period signal, where the third drawing procedure does not include drawing the picture of the first dynamic element; executes the fourth drawing procedure in response to the fourth period signal, where the fourth drawing procedure includes drawing the picture of the first dynamic element; and executes the fifth drawing procedure in response to the fifth period signal, where the fifth drawing procedure does not include drawing the picture of the first dynamic element.

Further, if the second frame rate of the second dynamic element is equal to 60 Hz, in response to the first periodic signal, the electronic device displays a play screen obtained based on pictures of all screen elements drawn in response to the first periodic signal, where the first play screen displayed by the electronic device in response to the second periodic signal is the play screen obtained in response to the first periodic signal, and the first play screen displayed by the electronic device in response to the third periodic signal is the play screen obtained in response to the first periodic signal; and the electronic device displays a second play screen in response to the fourth periodic signal, where the second play screen is generated based on the picture drawn in response to the fourth periodic signal and the picture of the static element, and the first play screen displayed by the electronic device in response to the fifth periodic signal is the second play screen obtained in response to the fourth periodic signal.

S914: The electronic device displays a second play screen, where the second play screen is a play screen obtained based on the picture drawn in response to the i-th periodic signal and the picture of the static element.

When determining that the first dynamic element is drawn in the i-th drawing procedure, the electronic device may render pictures of all screen elements in the play screen that are obtained in the i-th drawing procedure to obtain play pictures. The electronic device then composites a play screen i (which may be referred to as a second play screen) based on the play pictures and stores the second play screen in a cache. An LCD driver of the electronic device reads the second play screen from the cache and displays it.

It can be understood that the i-th drawing procedure includes drawing the picture of the first dynamic element, meaning that the electronic device updates the picture of the first dynamic element when executing the i-th drawing procedure. Based on the foregoing analysis of "the user usually focuses on the first dynamic element when watching the play screen", after executing the i-th drawing procedure in response to the i-th periodic signal, the electronic device continues to render the pictures and generates the second play screen. Since the second play screen includes an updated picture of the first dynamic element, when the second play screen is displayed, the updated picture of the first dynamic element is displayed. This ensures that the user watches smooth play of the first dynamic element.

Figure 9C:
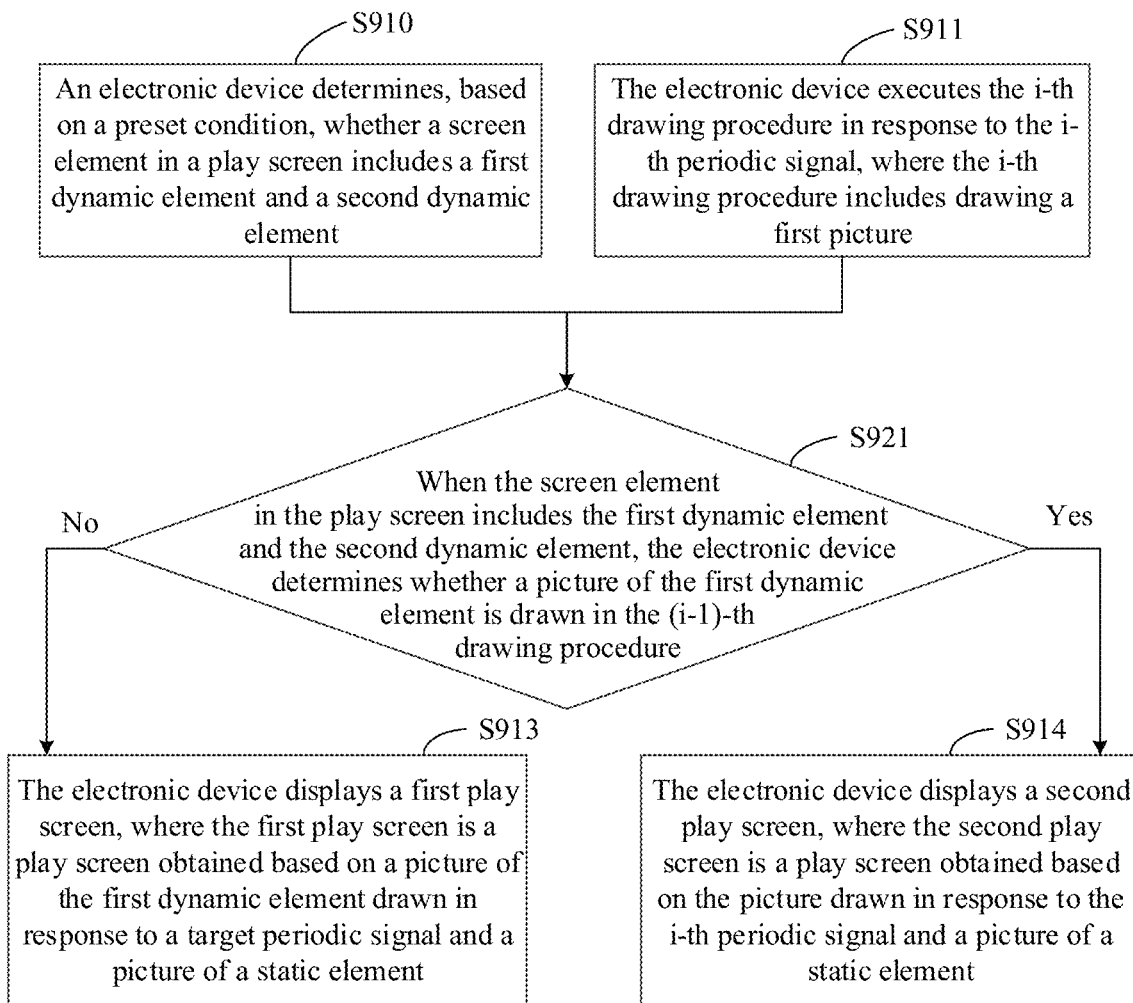
FIG. 9C is Flowchart 3 of a method for displaying a play screen according to an embodiment of this application.

The following describes a specific process of how the electronic device responds to the i-th periodic signal by using an example in which a second frame rate of at least one second dynamic element is twice the first frame rate of the first dynamic element, and the reciprocal of the signal period of the i-th periodic signal is equal to the second frame rate of the second dynamic element. As shown in FIG. 9C, S902 in the method may not include S912, but include S921.

S921: When the screen element in the play screen includes the first dynamic element and the second dynamic element, the electronic device determines whether the picture of the first dynamic element is drawn in response to the (i−1)-th periodic signal.

That the second frame rate of the second dynamic element is twice the first frame rate of the first dynamic element, and the reciprocal of the signal period of the i-th periodic signal is equal to the second frame rate of the second dynamic element means that the electronic device updates the picture of the second dynamic element in response to each periodic signal and updates the picture of the first dynamic element every two periodic signals. In this way, the electronic device may determine whether the picture of the first dynamic element is drawn in response to the (i−1)-th periodic signal.

Then, if the picture of the first dynamic element is drawn in response to the (i−1)-th periodic signal, the electronic device does not draw the picture of the first dynamic element in response to the i-th periodic signal and executes S913. In this case, a target periodic signal in S913 is the (i−1)-th periodic signal. If the picture of the first dynamic element is not drawn in response to the (i−1)-th periodic signal, the electronic device draws the picture of the first dynamic element in response to the i-th periodic signal and executes S914.

In some embodiments, the electronic device may first obtain a visual attribute of each screen element in the play screen, and then determine, based on the visual attribute, whether the screen element in the play screen includes the first dynamic element and the second dynamic element.

Specifically, a visual element of each screen element may include a dimension of the screen element. The electronic device calculates an area proportion of each screen element based on the dimension of the screen element. The visual attribute may also include coordinates of a start point of the screen element in the play screen. The electronic device may also determine, based on the dimension of the screen element and the coordinates of the start point of the screen element in the play screen, whether the second dynamic element is located at an edge of the play screen. The visual attribute may also include a background color of an area in which the screen element is located.

For example, when the electronic device executes the first drawing procedure in response to the first periodic signal, in addition to obtaining pictures of all screen elements in the play screen, the electronic device may also obtain visual attributes of all the screen elements. After executing the first drawing procedure, the electronic device may determine, based on the visual attributes of all the screen elements, whether the screen element in the play screen includes the first dynamic element and the second dynamic element. Further, when determining that the screen element in the play screen includes the first dynamic element and the second dynamic element, the electronic device determines whether a procedure of the picture of the first dynamic element is drawn in the i-th drawing procedure executed in response to the i-th periodic signal.

Figure 9D:
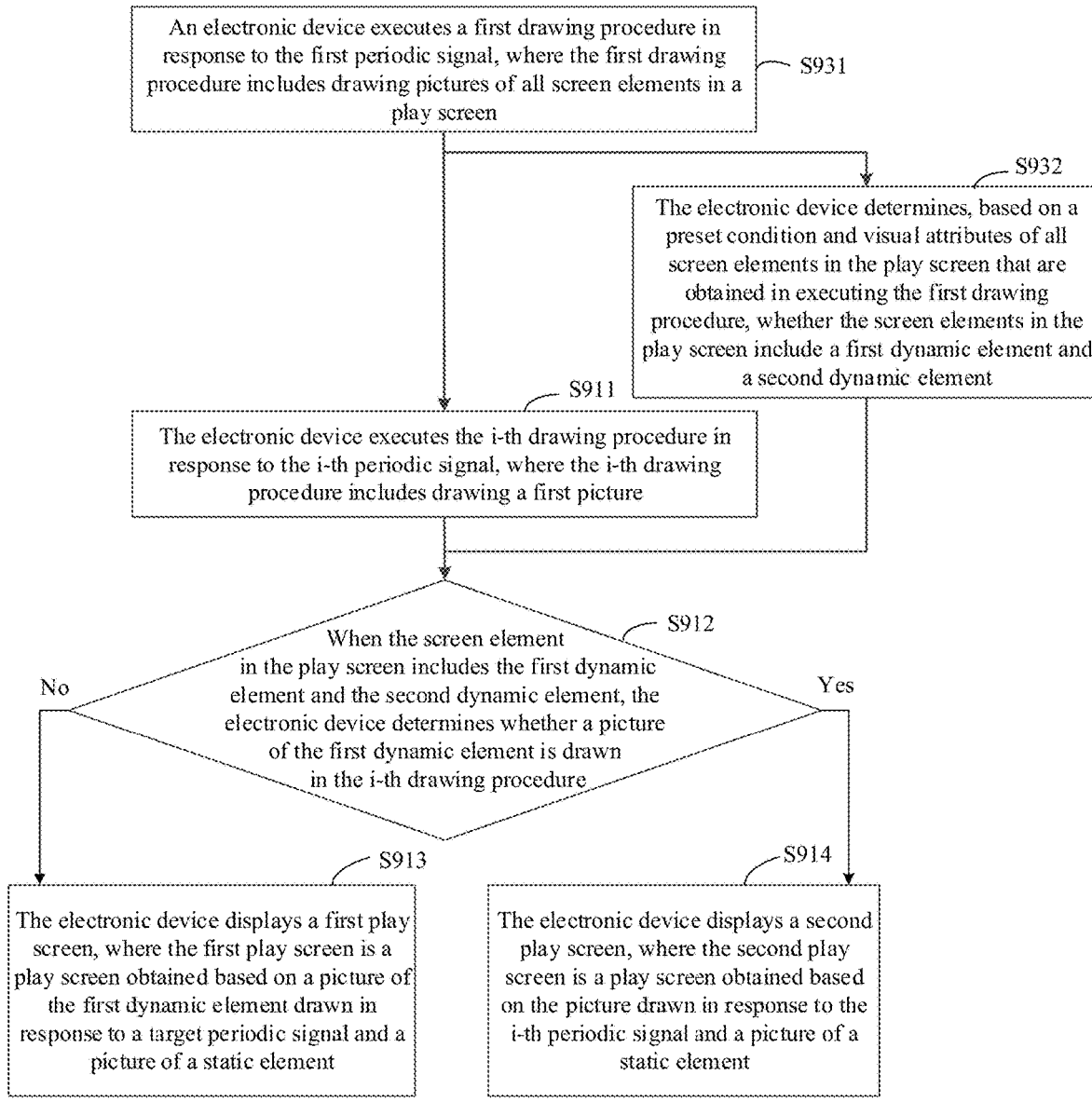
FIG. 9D is Flowchart 4 of a method for displaying a play screen according to an embodiment of this application.

For example, as shown in FIG. 9D, in the method for displaying a play screen provided in this embodiment of this application, the method further includes S931, S901 may include S932, and S902 includes S911 to S914.

S931: The electronic device executes the first drawing procedure in response to the first periodic signal, where the first drawing procedure includes drawing pictures of all screen elements in the play screen.

S932: The electronic device determines, based on the preset condition and visual attributes of all screen elements in the play screen that are obtained by executing the first drawing procedure, whether the screen element in the play screen includes the first dynamic element and the second dynamic element.

Figure 10:
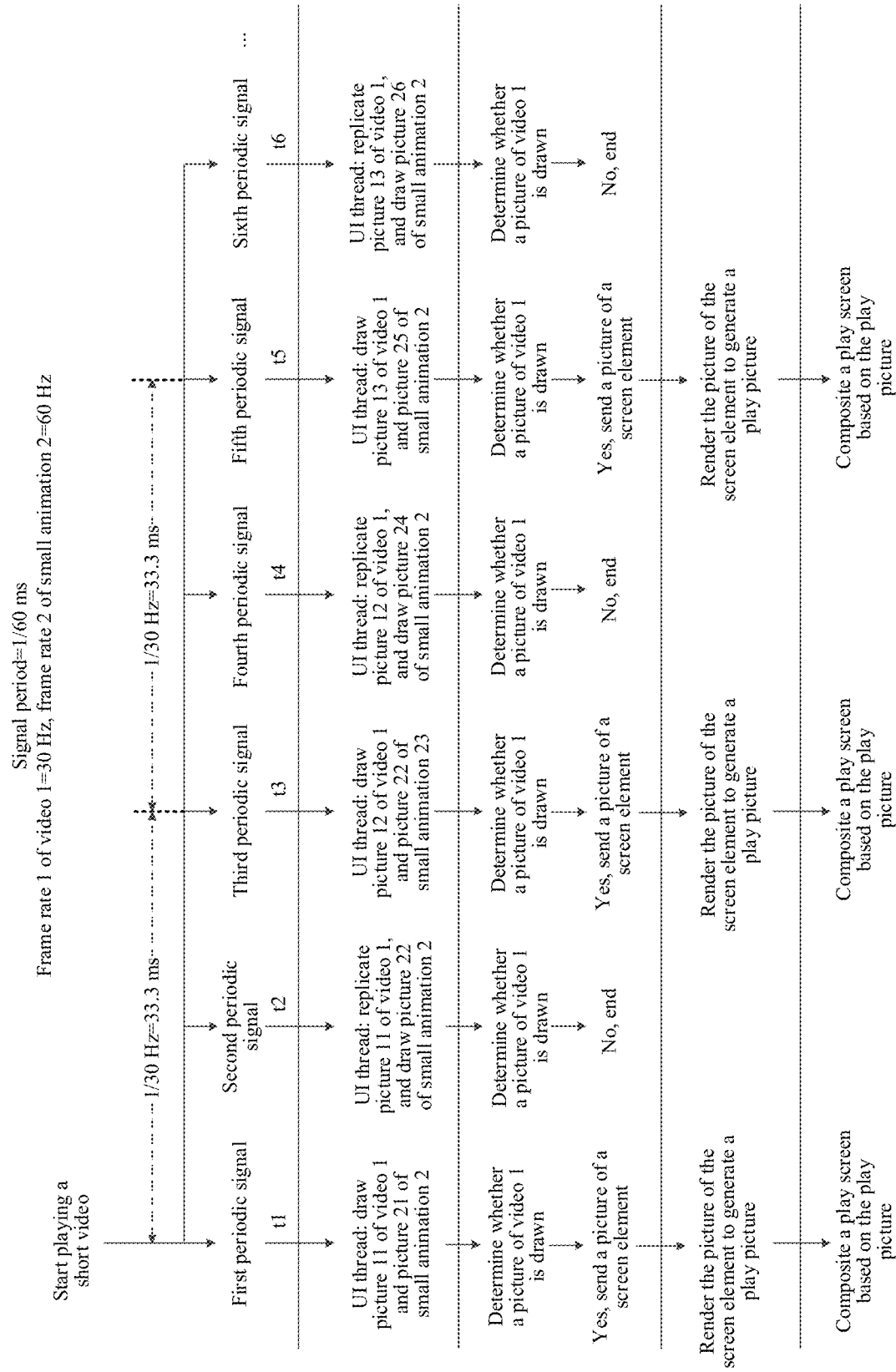
FIG. 10 is Refresh Flowchart 1 of a short video play screen by using a method for displaying a play screen according to an embodiment of this application.

The specific process of displaying a play screen by the electronic device is described by using an example in which the first dynamic element is video 1, the second dynamic element is a small animation element, a frame rate of video 1 is 30 Hz, and a frame rate of the small animation element is 60 Hz. As shown in FIG. 10, in response to the first periodic signal, a UI framework in the electronic device calls UI thread 1 corresponding to the foreground application to execute the first drawing procedure. The first drawing procedure includes drawing pictures of all screen elements in the play screen, for example, drawing picture 11 of video 1 and drawing picture 21 of small animation 2. The UI framework sends the pictures of all the screen elements in the play screen that are obtained in the first drawing procedure to a GPU. The GPU calls a rendering thread to render the pictures of all the screen elements in the play screen to obtain play pictures. Then, a hardware compositor (Hardware Composer, HWC) may call a composition thread to composite the play pictures to obtain a play screen.

In response to the second periodic signal, the UI framework in the electronic device calls the UI thread to execute the second drawing procedure. Then, the UI framework determines whether the picture of video 1 is drawn in the second drawing procedure. If the picture of video 1 is not drawn in the second drawing procedure, it means that the first screen drawn in the second drawing procedure does not include a screen of the first dynamic element, and the UI framework neither sends the pictures of all the screen elements to the GPU nor renders the pictures.

In response to the third periodic signal, the UI framework in the electronic device calls the UI thread to execute the third drawing procedure. Then, the UI framework determines whether the picture of video 1 is drawn in the third drawing procedure. If the picture of video 1 is drawn in the third drawing procedure, it means that the first screen drawn in the third drawing procedure includes a screen of the first dynamic element, and the UI framework sends the pictures of all the screen elements to the GPU.

Similarly, the electronic device sequentially responds to the fourth periodic signal, the fifth periodic signal, the sixth periodic signal, and so on. Calling the UI thread in response to the fourth periodic signal does not trigger to draw the screen of the first dynamic element; calling the UI thread in response to the fifth periodic signal triggers to draw the screen of the first dynamic element; and calling the UI thread in response to the sixth periodic signal does not trigger to draw the screen of the first dynamic element.

It can be learned that only when the electronic device draws both the picture of small animation 1 and the picture of video 1 in response to the same periodic signal, the electronic device renders and composites the pictures of all the screen elements (including the drawn picture of video 1) that are obtained in response to the periodic signal to obtain the play screen and display it. In other words, small animation 1 and video 1 are updated at the same time. In this way, the frame rate of small animation 1 is reduced, and the reduced frame rate of small animation 1 is equal to the frame rate of video 1.

It should be noted that, after executing the first drawing procedure, the electronic device may not execute the step of "determining whether a picture of video 1 is drawn" in FIG. 10, but directly send the picture of the screen element.

In some embodiments, after executing the i-th drawing procedure in response to a periodic signal, the electronic device records a screen element drawn in the i-th drawing procedure. Based on the drawn screen element, the electronic device may determine whether the picture of the first dynamic element is drawn in the i-th drawing procedure, and may also determine whether to display a first screen element or a second screen element.

Specifically, if a first picture drawn by the electronic device in response to the j-th periodic signal includes the picture of the first dynamic element, a first icon may be added. The first icon is used to indicate that the picture of the first dynamic element and the picture of the second dynamic element are drawn in response to the j-th periodic signal. If the first picture drawn by the electronic device in response to the j-th periodic signal does not include the picture of the first dynamic element, a second icon may be added. The second icon is used to indicate that the picture of the second dynamic element is drawn in response to the j-th periodic signal and the picture of the first dynamic element is not drawn. j is an integer, and j takes a value in {1, 2, 3, 4 . . . } in sequence.

The electronic device draws different types of screen elements by using different types of element classes, for example, video element classes used for drawing videos and text element classes used for drawing texts. Video element classes used in an Android system may include a TextureView class and a SurfaceView class. Therefore, the electronic device may determine a screen element to be drawn according to an element class used.

In some embodiments, after the electronic device executes any drawing procedure, in addition to determining a screen element to be drawn, the electronic device may also determine whether the foreground application is a target application. The target application may be used to represent an application that requires reducing of power consumption. When the foreground application is the target application, the electronic device may determine, based on the drawn screen element, whether to display the first screen element or the second screen element. When the foreground application is not the target application, the electronic device may execute the rendering procedure and the composition thread in sequence, and display a composited play screen.

Figure 11:
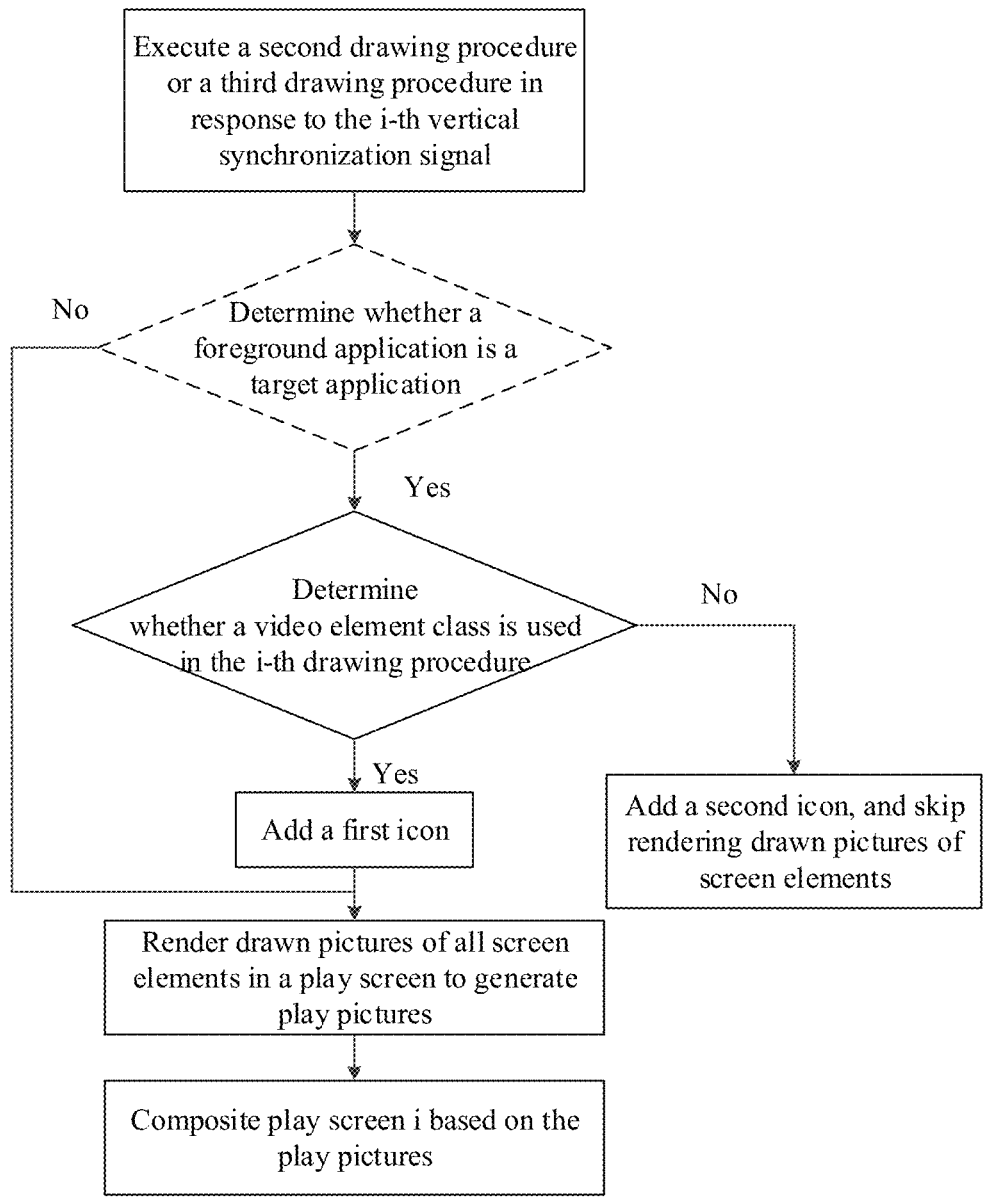
FIG. 11 is a processing flowchart of an electronic device responding to an i-th periodic signal according to an embodiment of this application.

The specific process of how the electronic device responds to the i-th periodic signal is described by using an example in which the first dynamic element is a video and the second dynamic element is a small animation element. As shown in FIG. 11, the electronic device executes the i-th drawing procedure in response to the i-th periodic signal (for example, the second drawing procedure or the third drawing procedure). Then, the electronic device determines whether the foreground application is a target application. If the foreground application is the target application, the electronic device may determine whether a video element class (for example, a TextureView class) is used in the i-th drawing procedure. If the video element class is used in the i-th drawing procedure, a first icon is added, and the electronic device may also determine that the picture of the first dynamic element is drawn in the i-th drawing procedure. If the video element class is not used in the i-th drawing procedure, a second icon is added, and the electronic device may also determine that the picture of the first dynamic element is not drawn in the i-th drawing procedure. When the electronic device generates the first icon or the foreground application is not the target application, the electronic device renders pictures of all screen elements in the play screen that are generated in the i-th drawing procedure to generate play pictures, and then composites a play screen i based on the play pictures. When generating the second icon, the electronic device does not render the pictures.

It should be noted that the step of "determining whether the foreground application is a target application" is optional, and the electronic device may not execute this step.

Figure 12:
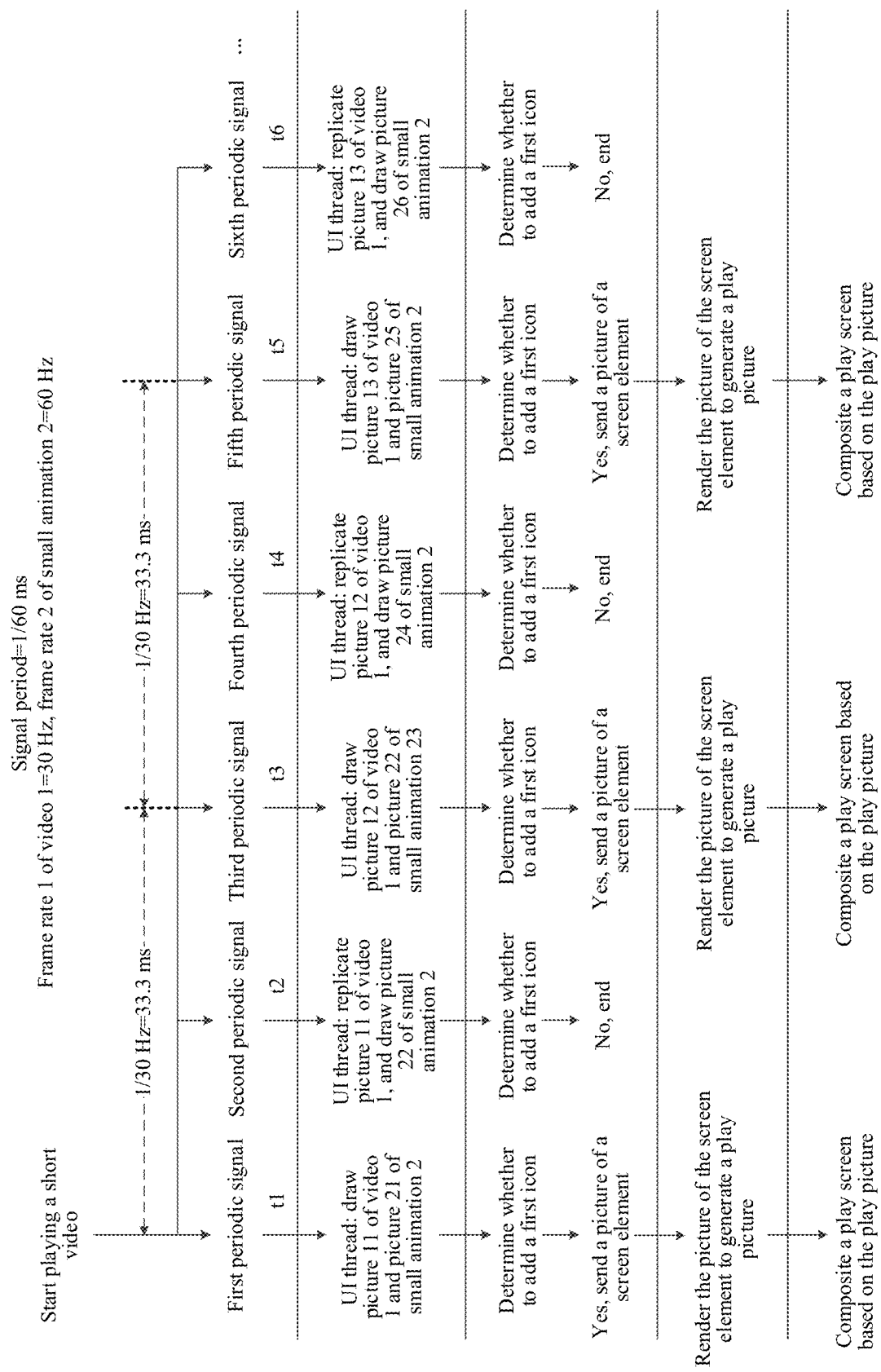
FIG. 12 is Refresh Flowchart 2 of a short video play screen by using a method for displaying a play screen according to an embodiment of this application.

The specific process of displaying a play screen by the electronic device is described still by using an example in which the first dynamic element is video 1, the second dynamic element is a small animation element, a frame rate of video 1 is 30 Hz, and a frame rate of the small animation element is 60 Hz. As shown in FIG. 12, in response to the first periodic signal, the UI framework in the electronic device calls a UI thread corresponding to the foreground application to execute the first drawing procedure. Then, the UI framework determines, based on whether a video element class is used in the first drawing procedure, whether to add a first icon. If the video element class is used in the first drawing procedure, the UI framework adds the first icon, and then sends pictures of all screen elements in the play screen that are obtained in the first drawing procedure to the GPU. The GPU calls a rendering thread to render the pictures of all the screen elements in the play screen to obtain play pictures. Then, a hardware compositor (Hardware Composer, HWC) may call a composition thread to composite the play pictures to obtain a play screen.

In response to the second periodic signal, the UI framework in the electronic device calls the UI thread to execute the second drawing procedure. Then, the UI framework determines, based on whether a video element class is used in the second drawing procedure, whether to add a first icon. If the video element class is not used in the second drawing procedure, the UI framework adds a second icon, does not send pictures of all screen elements to the GPU (in other words, does not render the pictures), and may also determine that the picture of the first dynamic element is not drawn in the second drawing procedure.

In response to the third periodic signal, the UI framework in the electronic device calls the UI thread to execute the third drawing procedure. Then, the UI framework determines, based on whether a video element class is used in the third drawing procedure, whether to add a first icon. If the video element class is used in the third drawing procedure, the UI framework adds the first icon, sends pictures of all screen elements to the GPU, and may also determine that the picture of the first dynamic element is drawn in the third drawing procedure.

Similarly, the UI framework in the electronic device sequentially responds to the fourth periodic signal, the fifth periodic signal, the sixth periodic signal, and so on.

It should be noted that, after executing the first drawing procedure, the electronic device may not execute the step of "determining whether to add a first icon" in FIG. 12, but directly send the picture of the screen element.

Figure 13:
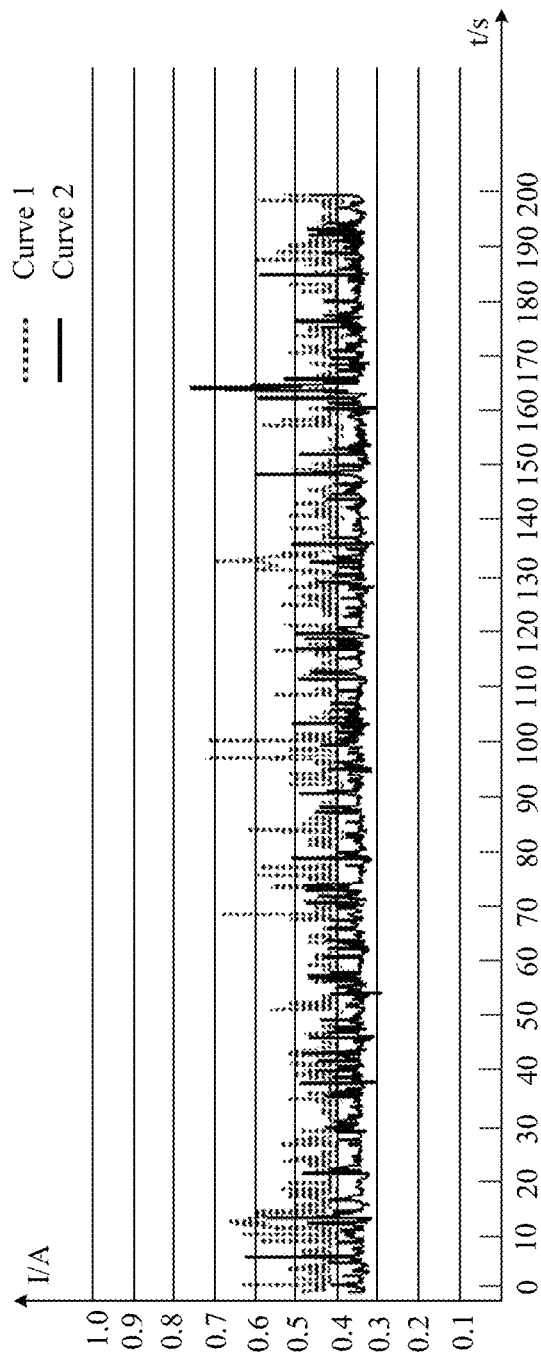
FIG. 13 is a comparison diagram of power consumption generated by using two methods to update a play screen according to an embodiment of this application.

For example, an application with a video play function is running in the foreground of the electronic device, and a play screen of the application includes the first dynamic element and the second dynamic element. The electronic device uses the conventional technology as shown in FIG. 6 to update and display the play screen of the application. In the process of updating and displaying the play screen by using the conventional technology, a current change curve of the electronic device is shown as curve 1 in FIG. 13. When the electronic device uses the method for displaying a play screen provided in this embodiment of this application, current changes in the process of updating and displaying the play screen of the application are shown as curve 2 in FIG. 13.

It can be seen that currents in curve 1 are all higher than currents in curve 2. The mean value of the currents in curve 1 is equal to 0.44615 amps (A), that is, 446.15 milliamps (mA). The mean value of the currents in curve 2 is equal to 381.89 mA. It can be seen from this that a current for updating and displaying the play screen of the application by using the method for displaying a play screen provided in the embodiments of this application is less than a current for updating and displaying the play screen of the application by using the conventional technology. In a case that a voltage of the electronic device remains unchanged, power consumption generated in updating and displaying the play screen of the application by using the method for displaying a play screen provided in the embodiments of this application is lower than power consumption generated in updating and displaying the play screen of the application by using the conventional technology.

An embodiment of this application further provides an electronic device. The electronic device may include a memory and one or more processors. The memory is coupled to the processor. The memory is configured to store computer program code, and the computer program code includes computer instructions. When the processor executes the computer instructions, the electronic device may perform the functions or steps performed by the electronic device in the foregoing method embodiment. For the structure of the electronic device, reference may be made to the structure of the electronic device 100 shown in FIG. 1.

Figure 14:
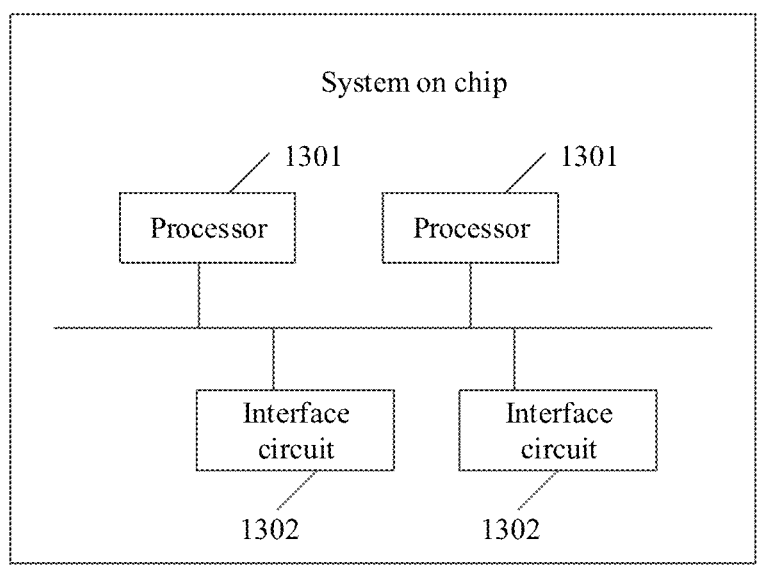
FIG. 14 is a schematic structural diagram of a system on chip according to an embodiment of this application.

An embodiment of this application further provides a system on chip. As shown in FIG. 14, the system on chip includes at least one processor 1301 and at least one interface circuit 1302. The processor 1301 and the interface circuit 1302 may be interconnected by a line. For example, the interface circuit 1302 may be configured to receive signals from another apparatus (for example, a memory of an electronic device). For another example, the interface circuit 1302 may be configured to send signals to another apparatus (for example, the processor 1301 or a display of an electronic device). For example, the interface circuit 1302 may read instructions stored in a memory and send the instructions to the processor 1301. When the instructions are executed by the processor 1301, an electronic device may be enabled to perform the steps in the foregoing embodiments. The system on chip may also include other discrete devices. This is not specifically limited in this embodiment of this application.

An embodiment of this application further provides a computer-readable storage medium. The computer-readable storage medium includes computer instructions. When the computer instructions are executed on an electronic device, the electronic device is enabled to perform the functions or steps performed by the electronic device in the foregoing method embodiment.

An embodiment of this application further provides a computer program product. When the computer program product runs on an electronic device, the electronic device is enabled to perform the functions or steps performed by the electronic device in the foregoing method embodiment.

Based on the description of the foregoing implementations, a person skilled in the art may understand that, for convenience and brevity of description, division into the foregoing functional modules is merely an example for illustration. In actual application, the foregoing functions may be allocated to different functional modules and implemented as required. That is, an inner structure of an apparatus is divided into different functional modules to implement all or some of the functions described above.

In the several embodiments provided in this application, it should be understood that the disclosed apparatus and method may be implemented in other manners. For example, the apparatus embodiment described above is merely an example for illustration. For example, the module or unit division is merely logical function division, and another division manner may be used in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, that is, the parts may be located in one place or distributed in different places. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the method described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for displaying a play screen of a foreground application, wherein a screen element in the play screen of the foreground application comprises a first dynamic element, and the first dynamic element has a first update frequency, the method comprising:
    determining, by an electronic device based on a preset condition, whether the screen element in the play screen comprises a second dynamic element, wherein the second dynamic element has a second update frequency, and the preset condition comprises that: an area proportion of the second dynamic element in the play screen is less than a preset threshold;
    drawing, by the electronic device based on the screen element, a first picture in response to the i-th periodic signal, when the screen element in the play screen comprises the second dynamic element;
    determining, by the electronic device, whether the first picture comprises a picture of the first dynamic element; and
    displaying, by the electronic device, the first picture when the first picture comprises the picture of the first dynamic element;
    wherein i is an integer, and i takes a value in {2, 3, 4 . . . } in sequence.

2. The method of claim 1, wherein the preset condition further comprises:
    a background color of an area in which the second dynamic element is located is transparent.

3. The method of claim 1, wherein the preset condition further comprising:
    the second dynamic element is located at an edge of the play screen.

4. The method of claim 1, further comprising:
    displaying, by the electronic device, a third picture when the first picture does not comprise the picture of the first dynamic element; and
    wherein the third picture is drawn by the electronic device based on the screen element, in response to the (i-1)-th periodic signal, and the third picture comprises the picture of the first dynamic element.

5. The method of claim 4, wherein the drawing, by the electronic device based on the screen element, the first picture in response to the i-th periodic signal comprises:
    replicating, by the electronic device, a second picture, wherein the second picture comprises a picture of a static element; and
    wherein the displaying, by the electronic device, the first picture comprising:
    displaying, by the electronic device, the first picture and the second picture.

6. The method of claim 5, wherein the second update frequency is twice the first update frequency; a reciprocal of a signal period of the i-th periodic signal is equal to the second update frequency; and
    wherein the replicating, by the electronic device, a second picture comprises:
    replicating, by the electronic device, the picture of the first dynamic element drawn by the electronic device in response to the (i-1)-th periodic signal, when the first picture does not comprise the picture of the first dynamic element.

7. The method of claim 1, wherein before the determining, by the electronic device based on the preset condition, whether the screen element in the play screen comprises the second dynamic element, the method further comprises:
    obtaining, by the electronic device, a visual attribute of each screen element in the play screen, wherein the visual attribute comprises a dimension of the screen element; and
    calculating, by the electronic device, the area proportion based on the dimension of the screen element.

8. The method of claim 7, wherein the preset condition further comprises the second dynamic element is located at an edge of the play screen; wherein the visual attribute further comprises coordinates of a start point of the screen element in the play screen; and
    wherein after the obtaining the visual attribute of each screen element in the play screen, the method further comprises:
    determining, by the electronic device based on the dimension of the screen element and the coordinates of the start point of the screen element in the play screen, whether the second dynamic element is located at the edge of the play screen.

9. The method of claim 4, further comprising:
    adding, by the electronic device, a first icon when the first picture comprises the picture of the first dynamic element, wherein the first icon indicating that the electronic device has drawn the picture of the first dynamic element; and
    adding, by the electronic device, a second icon when the first picture does not comprise the picture of the first dynamic element, wherein the second icon indicating that the electronic device has not drawn the picture of the first dynamic element.

10. The method of claim 1, wherein the determining, by the electronic device, whether the first picture comprises the picture of the first dynamic element comprises:
    determining, by the electronic device, whether the electronic device has drawn the picture of the first dynamic element by in response to the i-th periodic signal;
    determining, by the electronic device, the first picture comprises the picture of the first dynamic element, when the electronic device has drawn the picture of the first dynamic element by in response to the i-th periodic signal; and
    determining, by the electronic device, the first picture does not comprise the picture of the first dynamic element, when the electronic device has not drawn the picture of the first dynamic element in response to the i-th periodic signal.

11. A electronic device, comprising:
    a display displaying a play screen of a foreground application, wherein a screen element in the play screen of the foreground application comprises a first dynamic element, and the first dynamic element has a first update frequency;
    one or more processors; and
    one or more storage devices storing instructions that are operable, when executed by the one or more processors, to cause the one or more processors to perform operations comprising:
    determining, based on a preset condition, whether the screen element in the play screen comprises a second dynamic element, wherein the second dynamic element has a second update frequency, and the preset condition comprises that: an area proportion of the second dynamic element in the play screen is less than a preset threshold;

drawing, based on the screen element, a first picture in response to the i-th periodic signal, when the screen element in the play screen comprises the second dynamic element;

determining whether the first picture comprises a picture of the first dynamic element; and displaying the first picture when the first picture comprises the picture of the first dynamic element;

wherein i is an integer, and i takes a value in {2, 3, 4 . . . } in sequence.

12. The electronic device of claim 11, wherein the preset condition further comprises:

a background color of an area in which the second dynamic element is located is transparent.

13. The electronic device of claim 11, wherein the preset condition further comprises:

the second dynamic element is located at an edge of the play screen.

14. The electronic device of claim 11, the operations further comprising:

displaying a third picture when the first picture does not comprise the picture of the first dynamic element; and wherein the third picture is drawn by the electronic device based on the screen element, in response to the (i-1)-th periodic signal, and the third picture comprises the picture of the first dynamic element.

15. The electronic device of claim 14, wherein the drawing, based on the screen element, the first picture in response to the i-th periodic signal comprises:

replicating a second picture, wherein the second picture comprises a picture of a static element; and wherein the displaying the first picture comprising:

displaying the first picture and the second picture.

16. The electronic device of claim 15, wherein the second update frequency is twice the first update frequency; a reciprocal of a signal period of the i-th periodic signal is equal to the second update frequency; and wherein the replicating a second picture comprises:

replicating the picture of the first dynamic element drawn by the electronic device in response to the (i-1)-th periodic signal, when the first picture does not comprise the picture of the first dynamic element.

17. The electronic device of claim 11, wherein before the determining, based on the preset condition, whether the screen element in the play screen comprises the second dynamic element, the operations further comprises:

obtaining a visual attribute of each screen element in the play screen, wherein the visual attribute comprises a dimension of the screen element; and calculating the area proportion based on the dimension of the screen element.

18. The electronic device of claim 17, wherein the preset condition further comprises the second dynamic element is located at an edge of the play screen; wherein the visual attribute further comprises coordinates of a start point of the screen element in the play screen; and wherein after the obtaining the visual attribute of each screen element in the play screen, the operations further comprises:

determining, based on the dimension of the screen element and the coordinates of the start point of the screen element in the play screen, whether the second dynamic element is located at the edge of the play screen.

19. The electronic device of claim 14, wherein the operations further comprise:

adding a first icon when the first picture comprises the picture of the first dynamic element, wherein the first icon indicating that the electronic device has drawn the picture of the first dynamic element; and adding a second icon when the first picture does not comprise the picture of the first dynamic element, wherein the second icon indicating that the electronic device has not drawn the picture of the first dynamic element.

20. The electronic device of claim 11, wherein the determining whether the first picture comprises the picture of the first dynamic element comprises:

determining whether the electronic device has drawn the picture of the first dynamic element by in response to the i-th periodic signal;

determining the first picture comprises the picture of the first dynamic element, when the electronic device has drawn the picture of the first dynamic element by in response to the i-th periodic signal; and determining the first picture does not comprise the picture of the first dynamic element, when the electronic device has not drawn the picture of the first dynamic element in response to the i-th periodic signal.

\* \* \* \* \*